United States Patent
Zhang et al.

(10) Patent No.: US 10,645,725 B2
(45) Date of Patent: May 5, 2020

(54) METHOD, APPARATUS, AND SYSTEM FOR SENDING AND RECEIVING INFORMATION

(71) Applicant: HUAWEI TECHNOLOGIES CO., LTD., Shenzhen, Guangdong (CN)

(72) Inventors: Tao Zhang, Beijing (CN); Feng Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/019,932

(22) Filed: Jun. 27, 2018

(65) Prior Publication Data

US 2018/0324857 A1 Nov. 8, 2018

Related U.S. Application Data

(63) Continuation of application No. PCT/CN2015/099222, filed on Dec. 28, 2015.

(51) Int. Cl.
*H04L 5/00* (2006.01)
*H04W 74/08* (2009.01)
(Continued)

(52) U.S. Cl.
CPC ....... *H04W 74/0808* (2013.01); *H04L 5/0048* (2013.01); *H04W 52/0209* (2013.01);
(Continued)

(58) Field of Classification Search
CPC . H04W 74/08; H04W 52/02; H04W 74/0808; H04W 52/0209; H04L 5/00; H04L 5/0048
See application file for complete search history.

(56) References Cited

U.S. PATENT DOCUMENTS

| | | |
|---|---|---|
| 2010/0014460 A1 | 1/2010 | Shin et al. |
| 2012/0230205 A1 | 9/2012 | An et al. |

(Continued)

FOREIGN PATENT DOCUMENTS

| | | |
|---|---|---|
| CN | 101242333 A | 8/2008 |
| CN | 101321127 A | 12/2008 |

(Continued)

OTHER PUBLICATIONS

International Search Report, dated Oct. 9, 2016, in International Application No. PCT/CN2015/099222 (4 pp.)

(Continued)

*Primary Examiner* — Chi Ho A Lee
(74) *Attorney, Agent, or Firm* — Kilpatrick Townsend & Stockton LLP

(57) ABSTRACT

Embodiments of the present invention provide a method that includes: A network device and a terminal device determine a backoff time for a current frame, performs a CCA based on the backoff time, obtains an assessment result of the CCA, and sends a pilot when the assessment result of the CCA is that a channel is in an idle state; the terminal device listens on the channel based on the backoff time, and sends or receives data over the channel after detecting the pilot sent by the network device. This resolves a problem that a large quantity of electricity is wasted because the terminal device needs to keep listening on the channel when the network device is in an LBT process. The terminal device listens on the channel based on the backoff time; in another time period, the terminal device does not listen and may enter a sleep state.

20 Claims, 13 Drawing Sheets

(51) Int. Cl.
*H04W 72/04* (2009.01)
*H04W 52/02* (2009.01)

(52) U.S. Cl.
CPC ........... *H04W 72/04* (2013.01); *H04W 74/08* (2013.01); *Y02D 70/122* (2018.01); *Y02D 70/1262* (2018.01); *Y02D 70/142* (2018.01)

(56) References Cited

U.S. PATENT DOCUMENTS

| | | | |
|---|---|---|---|
| 2013/0170479 A1* | 7/2013 | Fong | H04W 74/085 370/336 |
| 2014/0341018 A1 | 11/2014 | Bhushan et al. | |
| 2015/0049712 A1* | 2/2015 | Chen | H04W 72/1215 370/329 |
| 2015/0237548 A1* | 8/2015 | Luo | H04L 5/0076 370/329 |
| 2016/0081047 A1* | 3/2016 | Kwak | H04W 56/001 370/350 |
| 2016/0143014 A1* | 5/2016 | Mukherjee | H04W 74/0816 370/330 |
| 2016/0157264 A1* | 6/2016 | Wang | H04W 74/0808 370/329 |
| 2016/0309354 A1* | 10/2016 | Yerramalli | H04W 24/08 |
| 2017/0086152 A1* | 3/2017 | Li | H04W 56/001 |
| 2017/0164406 A1* | 6/2017 | Son | H04W 74/08 |
| 2017/0181164 A1* | 6/2017 | Tandai | H04W 84/12 |
| 2017/0188387 A1* | 6/2017 | Mukherjee | H04W 74/0808 |
| 2018/0235002 A1* | 8/2018 | Son | H04B 7/26 |
| 2018/0249484 A1* | 8/2018 | Kim | H04W 72/1242 |

FOREIGN PATENT DOCUMENTS

| | | |
|---|---|---|
| CN | 101795498 A | 8/2010 |
| CN | 104202806 A | 12/2014 |
| CN | 104219776 A | 12/2014 |
| CN | 104219778 A | 12/2014 |
| EP | 2887752 A1 | 6/2015 |
| KR | 100813884 B1 | 3/2008 |

OTHER PUBLICATIONS

R1-151807 ZTE, "Design of Reservation Signal for LAA," 3GPP TSG RAN WG1 Meeting #80bis, Belgrade, Serbia, Apr. 20-24, 2015, pp. 1-5.
Extended European Search Report, dated Oct. 10, 2018, in European Application No. 15911695.3 (11 pp.).
"IEEE Standard for Low-Rate Wireless Networks," IEEE Std 802.15.47™-2015 (Revision of IEEE Std 802.15.4-2011), IEEE Computer Society, Sponsored by the LAN/MAN Standards Committee (708 pp.).
International Search Report, dated Sep. 10, 2016, in International Application No. PCT/CN2015/099222 (4 pp.).
Written Opinion of the International Searching Authority, dated Sep. 10, 2016, in International Application No. PCT/CN2015/099222 (8 pp.).

* cited by examiner

METHOD, APPARATUS, AND SYSTEM FOR SENDING AND RECEIVING INFORMATION

CROSS-REFERENCE TO RELATED APPLICATIONS

This application is a continuation of International Application No. PCT/CN2015/099222, filed on Dec. 28, 2015, the disclosure of which is hereby incorporated by reference in its entirety.

TECHNICAL FIELD

Embodiments of the present invention relate to the communications field, and in particular, to a method, an apparatus, and a system for sending and receiving information.

BACKGROUND

A radio spectrum needs to be used for wireless communication between two devices. The radio spectrum is roughly classified into a licensed (Licensed) spectrum and an unlicensed (Unlicensed) spectrum.

When wireless communication is performed by using the unlicensed spectrum, a network device needs to perform a clear channel assessment (CCA) on a channel for which the unlicensed spectrum is used. If an assessment result is that the channel is in a non-idle state, it indicates that the channel is being used by another device. If an assessment result is that the channel is in an idle state, the network device first sends a pilot to a terminal device over the channel, and then sends current-frame data to the terminal device over the channel, or receives, over the channel, current-frame data sent by the terminal device. A frame occupies a fixed time period. The time period includes two parts of time. In a first part of time, the network device sends a pilot to the terminal device. In a second part of time, the network device sends data to the terminal device or receives data from the terminal device. An entire process in which the network device performs the CCA is referred to as a listen before talk (LBT) process. A quantity of CCAs in each LBT process is uncertain. Therefore, duration of the LBT process is also uncertain. In addition, duration of each CCA is usually fixed duration, or is possibly unfixed duration.

When the network device is in the LBT process, the terminal device needs to keep listening over the channel, to receive a pilot and data that are sent by the network device. If duration of the LBT process is relatively long and power of the terminal device is supplied by using a battery, a large quantity of electricity of the terminal device is wasted.

SUMMARY

Embodiments of the present invention provide a method, an apparatus, and a system for sending and receiving information, to resolve a problem that a large quantity of electricity of a terminal device is wasted due to relatively long LBT duration. The technical solutions are as follows.

According to a first aspect, an embodiment of the present invention provides a method for sending and receiving information, where the method includes: determining, by a network device, a backoff time for a current frame; performing, by the network device, a clear channel assessment CCA on a channel at an end moment of the backoff time, and obtaining an assessment result of the CCA; sending, by the network device, a pilot over the channel when the assessment result of the CCA is that the channel is in an idle state; and after sending the pilot, sending, by the network device, current-frame data to a terminal device over the channel, or receiving, over the channel, current-frame data sent by a terminal device.

According to the method for sending and receiving information provided in this embodiment of the present invention, the terminal device determines the backoff time for the current frame, and listens on the channel based on the backoff time. The terminal device starts listening on the channel only when the network device possibly sends a pilot or data to the terminal device. In a time period in which it is impossible for the network device to send a pilot or data to the terminal device, the terminal device does not listen on the channel, or enters a sleep state. This reduces duration of listening on the channel by the terminal device, and reduces battery electricity consumption of the terminal device caused by listening.

In a possible design, after the determining, by a network device, a backoff time for a current frame, and before the performing a clear channel assessment CCA on a channel at an end moment of the backoff time, the method further includes: sending, by the network device, indication signaling to the terminal device, where the indication signaling is used to indicate the backoff time. In this way, based on the backoff time, the terminal device can determine a moment at which the network device possibly sends a pilot, and the terminal device listens on the channel at the moment; and the terminal device can determine a moment at which the network device sends no pilot, and the terminal device does not listen on the channel or enters the sleep state at the moment. Therefore, the terminal device does not need to continuously listen on the channel. This reduces listening duration, and reduces battery electricity consumption of the terminal device caused by listening.

In another possible design, the indication signaling at least includes: a length of each of N backoff time, where N is a positive integer; or a length of a specified backoff time of N backoff time, and a length relationship between the specified backoff time and a backoff time of the N backoff time except the specified backoff time, where the length relationship is an index relationship, a multiple relationship, or an arithmetic sequence relationship, and N is a positive integer. The network device determines the length of the specified backoff time of the N backoff time, determines the length relationship between the another backoff time and the specified backoff time, and sends the length of the specified backoff time and the determined length relationship to the terminal device by using the indication signaling. This can reduce a data volume that the indication signaling needs to carry.

In another possible design, the indication signaling further includes duration $L_{cca}$ of a CCA corresponding to each backoff time. The network device also sends, by using the indication signaling, the duration of a CCA corresponding to each backoff time to the terminal device. The terminal device determines a length of the backoff time and the duration of the corresponding CCA, and starts listening on the terminal device after an end moment of the CCA. This further reduces duration of listening on the channel by the terminal device, and further reduces battery electricity consumption of the terminal device caused by listening.

In another possible design, the indication signaling further includes a maximum quantity $N_{max}$ of backoff time. The network device determines the maximum quantity $N_{max}$ of backoff time, and sends the maximum quantity $N_{max}$ of backoff time to the terminal device by using the indication signaling. When an assessment result of an $N_{max}^{th}$ CCA performed by the network device is still that the channel is in a non-idle state, the network device gives up sending the current-frame data, and directly performs a backoff for a next frame. This avoids a problem that the network device spends excessively much time on an LBT process for the current frame and delays next-frame data communication.

In another possible design, when there are at least two backoff time for the current frame, the determining, by a network device, a backoff time for a current frame includes: when an assessment result of an $(i-1)^{th}$ CCA is that the channel is in a non-idle state, determining that a start moment of an $i^{th}$ backoff time is a moment corresponding to $ET_{i-1}$, and determining that an end moment of the $i^{th}$ backoff time is a moment corresponding to a sum of $ET_{i-1}$ and $L_i$, where $ET_{i-1}$ is corresponding to an end moment of the $(i-1)^{th}$ CCA, the $(i-1)^{th}$ CCA is a CCA performed at an end moment of an $(i-1)^{th}$ backoff time, $L_i$ is a length of the $i^{th}$ backoff time, and i is a positive integer greater than or equal to 2.

In another possible design, the determining, by a network device, a backoff time for a current frame includes: when an assessment result of an $(i-1)^{th}$ CCA is that the channel is in a non-idle state, detecting whether i is greater than the maximum quantity $N_{max}$; and if i is not greater than the maximum quantity $N_{max}$, determining that a start moment of an $i^{th}$ backoff time is a moment corresponding to $ET_{i-1}$ and an end moment of the $i^{th}$ backoff time is a moment corresponding to a sum of $ET_{i-1}$ and $L_i$, where $ET_{i-1}$ is corresponding to an end moment of the $(i-1)^{th}$ CCA, the $(i-1)^{th}$ CCA is a CCA performed at an end moment of an $(i-1)^{th}$ backoff time, $L_i$ is a length of the $i^{th}$ backoff time for the current frame, and i is a positive integer greater than or equal to 2.

In another possible design, after the detecting whether i is greater than the maximum quantity $N_{max}$, the method further includes: if i is greater than the maximum quantity $N_{max}$, determining that a start moment of a first backoff time for a next frame is a moment corresponding to a sum of $ET_{i-1}$ and $L_{frame}$, and determining that an end moment of the first backoff time for the next frame is a moment corresponding to a sum of $ET_{i-1}$, $L_{frame}$, and $L_1$, where $L_{frame}$ is duration of one frame, $L_1$ is a length of the first backoff time for the next frame, and i is a positive integer greater than or equal to 2. When a result of the $N_{max}{}^{th}$ CCA is that the channel is in the non-idle state, the network device gives up performing a CCA in the current frame, and directly performs a backoff for the next frame. This avoids a problem that the network device spends excessively much time on an LBT process for the current frame and delays next-frame data communication.

According to a second aspect, a method for sending and receiving information is provided, where the method includes: determining, by a terminal device, a backoff time for a current frame, where the backoff time is a backoff time before a network device performs a clear channel assessment CCA; listening, by the terminal device, on a channel based on the backoff time; and if the terminal device detects, over the channel, a pilot sent by the network device, receiving, by the terminal device, current-frame data sent by the network device over the channel, or sending current-frame data to the network device over the channel. The terminal device determines the backoff time for the current frame, and listens on the channel based on the backoff time. The terminal device starts listening on the channel only when the network device possibly sends a pilot or data to the terminal device. In a time period in which it is impossible for the network device to send a pilot or data to the terminal device, the terminal device does not listen on the channel, or enters a sleep state. This reduces duration of listening on the channel by the terminal device, and reduces battery electricity consumption of the terminal device caused by listening.

In a possible design, before the determining, by a terminal device, a backoff time for a current frame, the method further includes: receiving, by the terminal device, indication signaling sent by the network device, where the indication signaling is used to indicate the backoff time.

In another possible design, the indication signaling at least includes: a length of each of N backoff time, where N is a positive integer; or a length of a specified backoff time of N backoff time, and a length relationship between the specified backoff time and a backoff time of the N backoff time except the specified backoff time, where the length relationship is an index relationship, a multiple relationship, or an arithmetic sequence relationship. The terminal device receives the length of the specified backoff time of the N backoff time and the length relationship between the specified backoff time and the another backoff time of the N backoff time in the indication signaling, and thereby determines a length of each backoff time. This can reduce a data volume that the indication signaling needs to carry.

In another possible design, the indication signaling further includes duration $L_{cca}$ of a CCA corresponding to each backoff time. According to the method for sending and receiving information provided in this embodiment of the present invention, the terminal device determines a length of the backoff time and the duration of the corresponding CCA, and starts listening on the terminal device after an end moment of the CCA. This further reduces duration of listening on the channel by the terminal device, and further reduces battery electricity consumption of the terminal device caused by listening.

In another possible design, the indication signaling further includes a maximum quantity $N_{max}$ of backoff time. When a result of an $N_{max}{}^{th}$ CCA is that the channel is in a non-idle state, the network device gives up performing a CCA in the current frame, and directly performs a backoff for a next frame. This avoids a problem that the network device spends excessively much time on an LBT process for the current frame and delays next-frame data communication.

In another possible design, when there are at least two backoff time for the current frame, the determining, by a terminal device, a backoff time for a current frame includes: when the pilot is not detected during $(i-1)^{th}$ listening, determining that a start moment of an $i^{th}$ backoff time is a moment corresponding to $ET_{i-1}$, and determining that an end moment of the $i^{th}$ backoff time is a moment corresponding to a sum of $ET_{i-1}$ and $L_i$, where $ET_{i-1}$ is corresponding to an end moment of an $(i-1)^{th}$ CCA, the $(i-1)^{th}$ CCA is a CCA performed at an end moment of an $(i-1)^{th}$ backoff time, $L_i$ is a length of the $i^{th}$ backoff time, and i is a positive integer greater than or equal to 2.

In another possible design, the determining, by a terminal device, a backoff time for a current frame includes: when the pilot is not detected during $(i-1)^{th}$ listening, detecting whether i is greater than the maximum quantity $N_{max}$; and if i is not greater than the maximum quantity $N_{max}$, determining that a start moment of an $i^{th}$ backoff time is a moment corresponding to $ET_{i-1}$ and an end moment of the $i^{th}$ backoff time is a moment corresponding to a sum of $ET_{i-1}$ and $L_i$, where $ET_{i-1}$ is corresponding to an end moment of an $(i-1)^{th}$ CCA, the $(i-1)^{th}$ CCA is a CCA performed at an end moment of an $(i-1)^{th}$ backoff time, $L_i$ is a length of the $i^{th}$ backoff time for the current frame, and i is a positive integer greater than or equal to 2.

In another possible design, after the detecting whether i is greater than the maximum quantity $N_{max}$, the method includes: if i is greater than the maximum quantity $N_{max}$, determining that a start moment of a first backoff time for a next frame is a moment corresponding to a sum of $ET_{i-1}$ and $L_{frame}$, and determining that an end moment of the first backoff time for the next frame is a moment corresponding to a sum of $ET_{i-1}$, $L_{frame}$, and $L_1$, where $L_{frame}$ is duration of one frame, $L_1$ is a length of the first backoff time for the next frame, and i is a positive integer greater than or equal to 2. When the terminal device still does not detect the pilot during $N_{max}{}^{th}$ listening, the terminal device gives up sending the current-frame data, directly enters a sleep state, and listens based on a backoff moment for a next frame. This avoids a problem that the network device spends excessively much time on an LBT process for the current frame and delays next-frame data communication.

In another possible design, the listening, by the terminal device, on a channel based on the backoff time includes: starting, by the terminal device, listening after an end moment of the backoff time, where duration of the listening does not exceed preset listening duration; and the preset listening duration is default duration, or duration preconfigured by the network device.

In another possible design, the listening, by the terminal device, on a channel based on the backoff time includes: starting, by the terminal device, listening after a moment corresponding to a sum of an end moment of the backoff time and $L_{cca}$, where duration of the listening does not exceed preset listening duration; and $L_{cca}$ is duration of the CCA corresponding to the backoff time, and the preset listening duration is default duration, or duration preconfigured by the network device. The terminal device determines a length of the backoff time and the duration of the corresponding CCA, and starts listening on the terminal device after an end moment of the CCA. This further reduces duration of listening on the channel by the terminal device, and further reduces battery electricity consumption of the terminal device caused by listening.

According to a third aspect, a network device is provided, where the network device has a function of implementing behaviors of the network device in the method for sending and receiving information provided according to the first aspect, the function may be implemented by hardware or may be implemented by hardware executing corresponding software, and the hardware or the software includes one or more modules corresponding to the foregoing function.

According to a fourth aspect, a terminal device is provided, where the terminal device has a function of implementing behaviors of the terminal device in the method for sending and receiving information provided according to the second aspect, the function may be implemented by hardware or may be implemented by hardware executing corresponding software, and the hardware or the software includes one or more modules corresponding to the foregoing function.

According to a fifth aspect, a system for sending and receiving information is provided, where the system for sending and receiving information includes the network device provided according to the third aspect and the terminal device provided according to the fourth aspect.

DESCRIPTION OF EMBODIMENTS

A terminal device related to the embodiments of the present invention may be a device that provides voice and/or data connectivity for a user, a handheld device with a wireless connection function, or another processing device connected to a wireless modem. The terminal device may communicate with one or more core networks by using a radio access network (RAN). The terminal device may be a mobile terminal, such as a mobile phone (also referred to as a "cellular" phone) and a computer that is provided with a mobile terminal, for example, may be a portable mobile apparatus, a pocket-sized mobile apparatus, a handheld mobile apparatus, a computer built-in mobile apparatus, or an in-vehicle mobile apparatus, and these mobile apparatuses exchange voice and/or data with the radio access network. For example, the terminal device may be a device such as a personal communications service (PCS) phone, a cordless telephone set, a Session Initiation Protocol (SIP) phone, a wireless local loop (WLL) station, or a personal digital assistant (PDA). The terminal device may also be referred to as a system, a subscriber unit, a subscriber station, a mobile station, a mobile console (Mobile), a remote station (Remote Station), an access point, a remote terminal, an access terminal, a user terminal, a user agent, a user device, or user equipment.

A network device related to the embodiments of the present invention may be a base station. The base station may be configured to perform conversion between a received over-the-air frame and an IP packet, and serve as a router between the terminal device and another part of the access network, where the another part of the access network may include an Internet Protocol (IP) network. The base station may further coordinate attribute management of an air interface. For example, the base station may be a base transceiver station (BTS) in GSM or CDMA, may be a NodeB (NodeB) in WCDMA, or may be an evolved NodeB (eNB or e-NodeB, evolved Node B) in LTE. This is not limited in this application.

Figure 1:
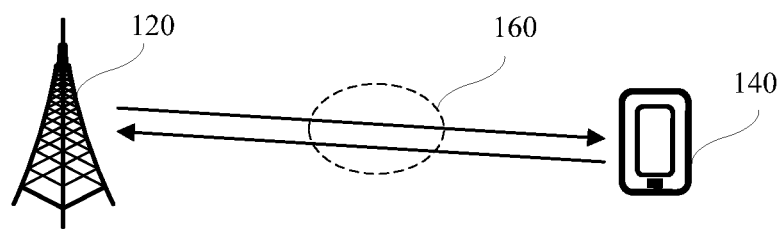
FIG. 1 is a schematic structural diagram of a system for sending and receiving information according to an example of an embodiment of the present invention.

Referring to FIG. 1, FIG. 1 is a schematic structural diagram of a system for sending and receiving information according to an example of an embodiment of the present invention. The system for sending and receiving information includes a network device 120 and a terminal device 140.

The network device 120 is a network element that interacts with the terminal device 140 in the system.

Optionally, the system is a mobile communications system.

Optionally, the system is a Wireless Fidelity (WIFI) system.

The network device 120 and the terminal device 140 communicate with each other over a channel 160. In this embodiment of the present invention, the channel 160 is a channel for which an unlicensed spectrum or a licensed shared spectrum (LSA) is used. The licensed shared spectrum is a licensed spectrum used by at least two operators in a share manner. A manner of using the shared spectrum is similar to that of using the unlicensed spectrum.

Optionally, the terminal device 140 is an electronic device having a wireless network communication capability.

Optionally, the network device 120 is an evolved NodeB (eNB or e-NodeB) in Long Term Evolution (LTE).

Optionally, the network device 120 is a NodeB (NodeB) in Wideband Code Division Multiple Access (WCDMA).

Optionally, the network device 120 is a base transceiver station (Base Transceiver Station, BTS) in Global System for Mobile Communications (GSM) or Code Division Multiple Access (CDMA).

Optionally, the network device 120 is an access point (AP) in Wireless Fidelity (WIFI).

Optionally, the terminal device 140 is an electronic device having a wireless network communication capability, for example, a mobile phone, a tablet computer, an ebook reader, or a laptop portable computer.

Optionally, the system for sending and receiving information may include a plurality of network devices 120 and a plurality of terminal devices 140. One network device 120 may perform data communication with a plurality of terminal devices 140. FIG. 1 shows only one network device 120 and one terminal device 140 as an example. Details are not described in this embodiment.

Figure 2:
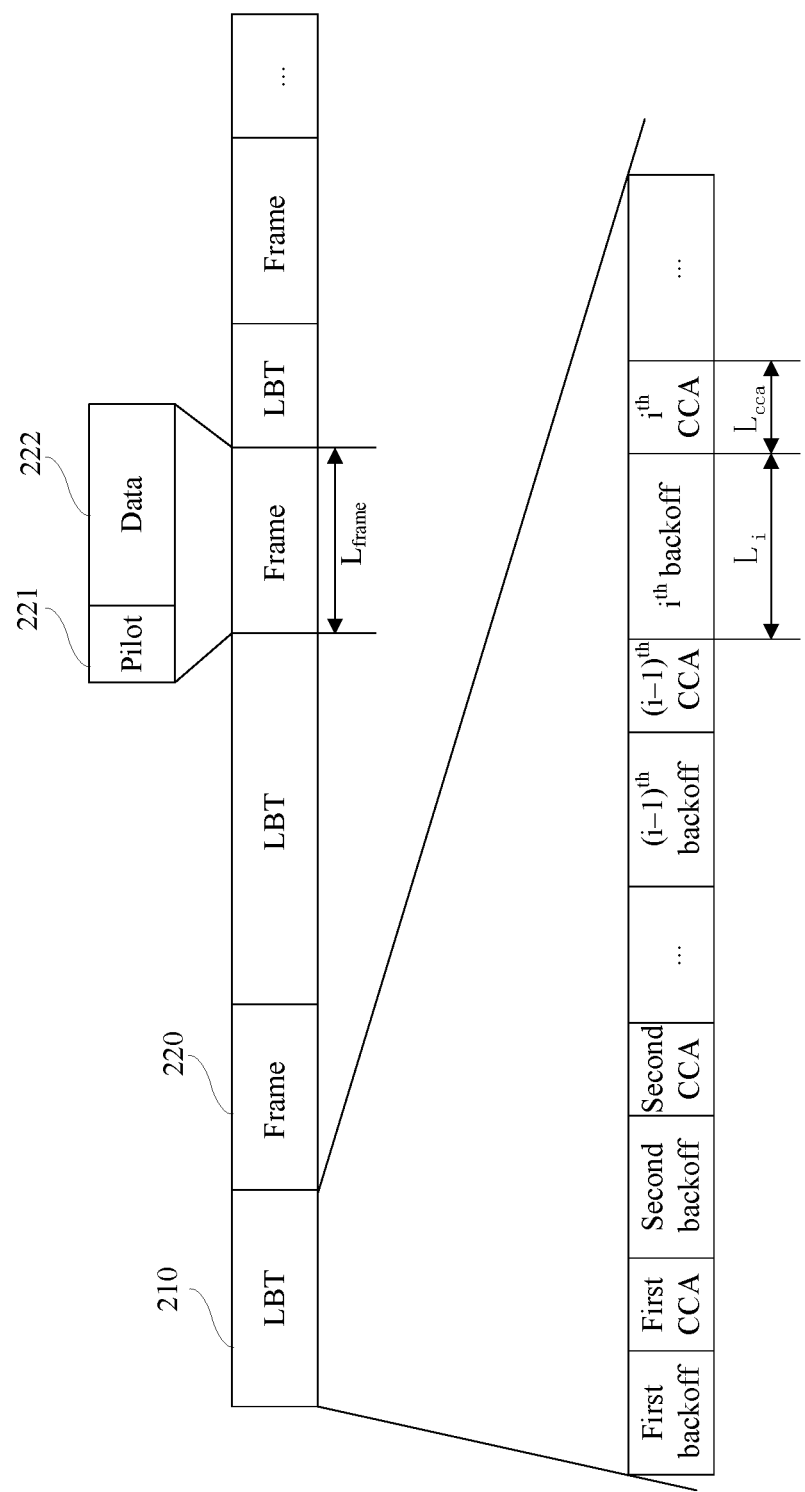
FIG. 2 is a schematic structural diagram of a method for sending and receiving information according to an example of an embodiment of the present invention.

When performing data communication with each other, the network device 120 and the terminal device 140 send or receive data in a frame form. When the network device 120 and the terminal device 140 perform data communication with each other over a channel for which an unlicensed spectrum or a licensed shared spectrum is used, the network device 120 performs LBT on the channel before sending and receiving data of each frame. As shown in FIG. 2, LBT 210 is an LBT process performed before the network device 120 sends and receives data of a frame 220.

The frame 220 includes a pilot 221 and data 222. Optionally, duration occupied by each of the pilot 221 and the data 222 is fixed, and therefore, duration $L_{frame}$ occupied by the frame 220 is also fixed.

The network device 120 may perform N CCAs on the channel in an LBT process for each frame 220. Time at which an assessment result of a CCA is that the channel is in an idle state is not fixed. Therefore, N is a positive integer whose value is variable. In each LBT process, the network device 120 backs off for a specific time period before performing a CCA. In other words, the network device starts to perform a CCA only after a backoff time (English: Backoff Time). The backoff time may also be understood as an off time period, a sleep time period, or a waiting time period that is agreed upon by the network device 120 and the terminal device 140. In other words, the network device 120 does not perform the CCA in the backoff time, and performs the CCA only after the backoff time. Correspondingly, in the backoff time, the terminal device 140 is in a sleep state and does not listen on the channel. The terminal device 140 enters an awake state only at an end moment of the backoff time, to listen on the channel.

Time at which a CCA result is that the channel is in an idle state is unpredictable. Therefore, for N backoff time in the LBT process for each frame 220, a value of N is variable. FIG. 2 shows a general example of N backoff time: a first backoff, a first CCA, . . . , an $i^{th}$ backoff, and an $i^{th}$ CCA, where $1 \le i \le N$. FIG. 2 does not show an LBT process in which i=1.

When the network device has performed an $i^{th}$ backoff, and an assessment result of an $i^{th}$ CCA is that the channel is in a non-idle state, the network device immediately performs an $(i+1)^{th}$ backoff. The rest may be deduced by analogy.

When the network device has performed an $i^{th}$ backoff, and an assessment result of an $i^{th}$ CCA is that the channel is in the idle state, the network device terminates the LBT process.

Optionally, duration $L_{cca}$ of a CCA performed after each backoff time is fixed.

Optionally, duration of each backoff is different. Duration of the $i^{th}$ backoff is an $i^{th}$ backoff time $L_i$.

Figure 3:
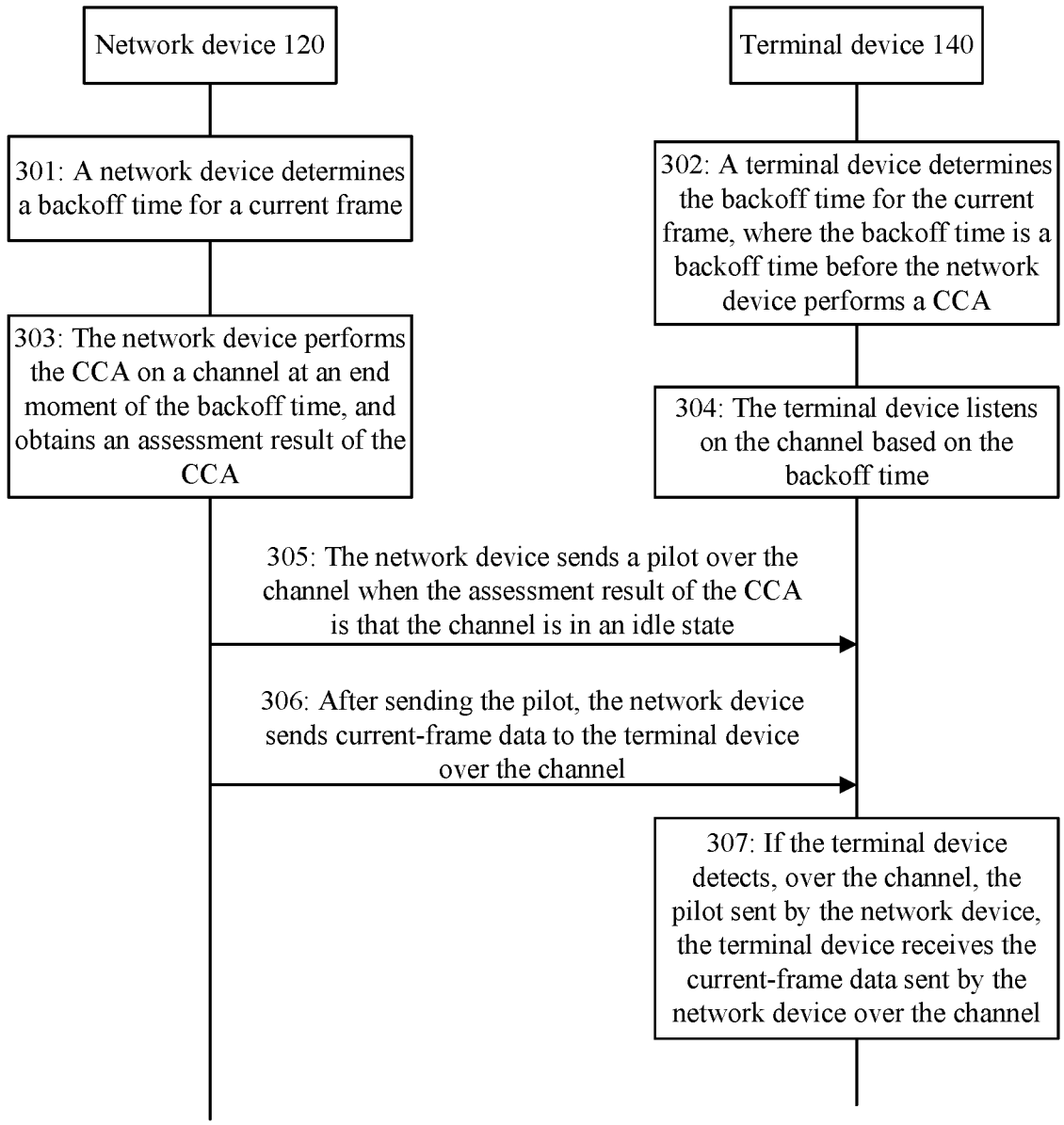
FIG. 3 is a flowchart of a method for sending and receiving information according to an example of an embodiment of the present invention.

Referring to FIG. 3, FIG. 3 is a flowchart of a method for sending and receiving information according to an example of an embodiment of the present invention. This embodiment is described by using an example in which the method is applied to the system for sending and receiving information shown in FIG. 1. The method includes the following steps.

Step 301: A network device determines a backoff time for a current frame.

Optionally, there are N backoff time for the current frame. N has different values for different current frames. A value of N is not limited in this embodiment.

Step 302: A terminal device determines the backoff time for the current frame, where the backoff time is a backoff time before the network device performs a CCA.

The backoff time is agreed upon by the network device and the terminal device in advance in a communications protocol, and the terminal device determines the backoff time for the current frame based on the communications protocol.

Alternatively, the backoff time is sent by the network device to the terminal device in advance by using indication signaling, and the terminal device determines the backoff time for the current frame based on the indication signaling sent by the network device.

Step 303: The network device performs the CCA on a channel at an end moment of the backoff time, and obtains an assessment result of the CCA.

Step 304: The terminal device listens on the channel based on the backoff time.

The terminal device starts listening after the end moment of the backoff time.

Alternatively, the terminal device starts listening after an end moment of the CCA.

That the terminal device starts listening after the end moment means that the terminal device starts listening at a next moment of the end moment of the backoff time or the CCA.

Optionally, for different time units, the next moment is determined in different manners. For example, the end moment is a $300^{th}$ ms. If a time unit is 1 ms, the next moment is a $301^{st}$ ms. If a time unit is 0.01 ms, the next moment is a $300.01^{st}$ ms. If a time unit is infinitely small, the next moment is a $300^{th}$ ms. A determining manner of the next moment is not limited in this embodiment.

Step 305: The network device sends a pilot over the channel when the assessment result of the CCA is that the channel is in an idle state.

Step 306: After sending the pilot, the network device sends current-frame data to the terminal device over the channel.

Step 307: If the terminal device detects, over the channel, the pilot sent by the network device, the terminal device receives the current-frame data sent by the network device over the channel.

The network device sends the current-frame data immediately after sending the pilot. The terminal device receives the current-frame data immediately after receiving the pilot.

It should be noted that the foregoing steps 301, 303, 305, and 306 may be separately implemented as a method for sending and receiving information on a network device side, and steps 302, 304, and 307 may be separately implemented as a method for sending and receiving information on a terminal device side.

Figure 3A:
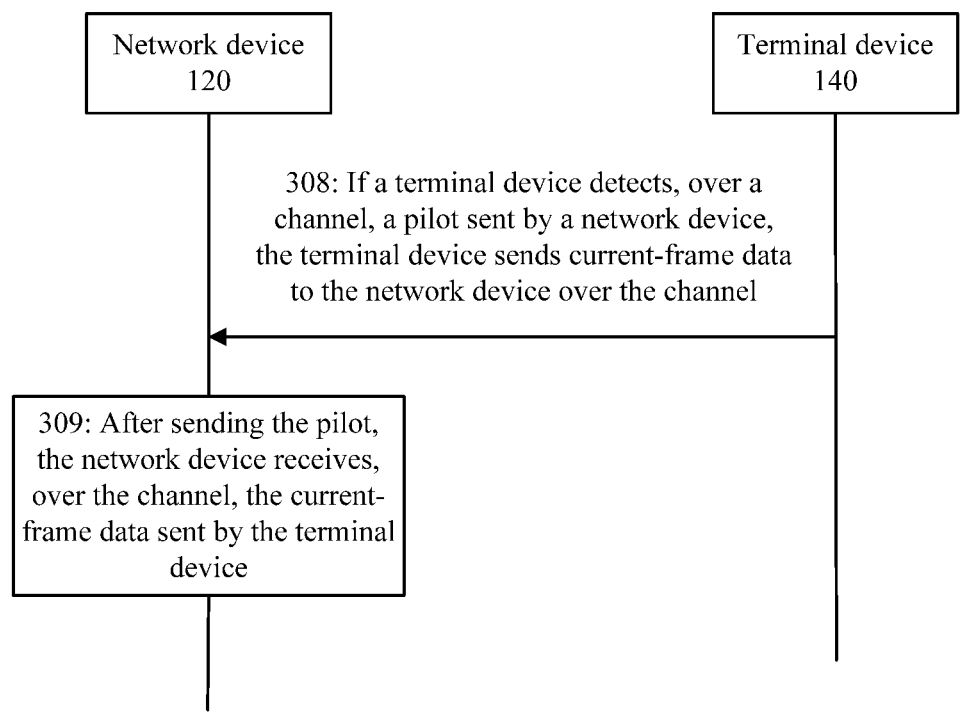
FIG. 3A is a flowchart of a method for sending and receiving information according to another example of an embodiment of the present invention.

Optionally, in another optional embodiment based on the foregoing embodiment, step 306 and step 307 may be replaced with step 308 and step 309 for implementation, as shown in FIG. 3A.

Step 308: If the terminal device detects, over the channel, the pilot sent by the network device, the terminal device sends current-frame data to the network device over the channel.

Step 309: After sending the pilot, the network device receives, over the channel, the current-frame data sent by the terminal device.

After receiving the pilot, the terminal device sends the current-frame data after a first preset time interval. In this case, after sending the pilot, the network device receives, after a second preset receiving interval, the current-frame data sent by the terminal device. The first preset time interval and the second preset time interval are not limited in this embodiment.

To sum up, according to the method for sending and receiving information provided in this embodiment of the present invention, the network device and the terminal device determine the backoff time for the current frame; the network device performs the CCA on the channel at the end moment of the backoff time, and obtains the assessment result of the CCA; the terminal device listens on the channel based on the backoff time; the network device sends the pilot over the channel when the assessment result of the CCA is that the channel is in the idle state, and sends or receives the current-frame data after sending the pilot; the terminal device sends or receives the current-frame data after detecting the pilot. In this way, the terminal device listens on the channel only when the network device possibly sends the pilot or data to the terminal device. In a time period in which it is impossible for the network device to send the pilot or data to the terminal device, the terminal device does not listen on the channel, or enters a sleep state. This reduces duration of listening on the channel by the terminal device, and reduces battery electricity consumption of the terminal device caused by listening.

Figure 4:
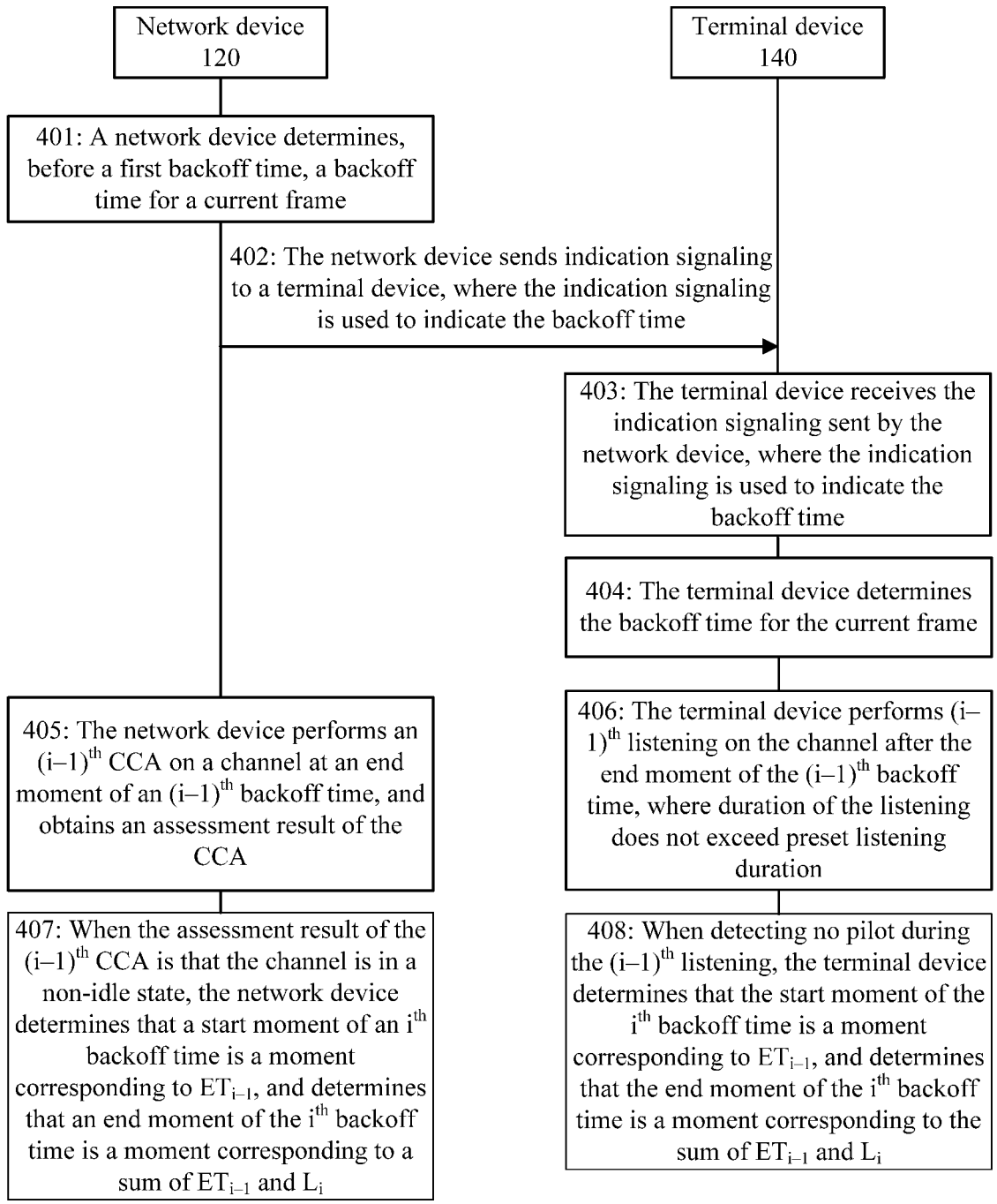
FIG. 4 is a flowchart of a method for sending and receiving information according to another example of an embodiment of the present invention.

Referring to FIG. 4, FIG. 4 is a flowchart of a method for sending and receiving information according to another example of an embodiment of the present invention. This embodiment is described by using an example in which the method is applied to the system for sending and receiving information shown in FIG. 1. The method includes the following steps.

Step 401: A network device determines, before a first backoff time, a backoff time for a current frame.

Optionally, there are at least two backoff time for the current frame.

Optionally, the network device determines that a length $L_1$ of the first backoff time for the current frame, a length $L_2$ of a second backoff time for the current frame, a length $L_3$ of a third backoff time for the current frame, and so on are all equal.

Optionally, a length of each backoff time is 300 ms.

Optionally, the network device determines the backoff time for the current frame at a start moment of the first backoff time for the current frame.

Step 402: The network device sends indication signaling to a terminal device, where the indication signaling is used to indicate the backoff time.

After determining the backoff time for the current frame, the network device may send the indication signaling to the terminal device before the first backoff time.

Optionally, the indication signaling includes a length of each backoff time. The network device informs the terminal device of the length of each backoff time for the current frame by using the indication signaling.

The network device performs a first backoff after sending the indication signaling to the terminal device.

Step 403: The terminal device receives the indication signaling sent by the network device, where the indication signaling is used to indicate the backoff time.

Optionally, the terminal device receives, at a start moment of the first backoff time for the current frame, the indication signaling sent by the network device.

Step 404: The terminal device determines the backoff time for the current frame.

The backoff time is a backoff time before the network device performs a CCA.

Optionally, this step is implemented as follows: The terminal device receives the indication signaling, and determines the length of each backoff time for the current frame based on the indication signaling.

Step 405: The network device performs an $(i-1)^{th}$ CCA on a channel at an end moment of an $(i-1)^{th}$ backoff time, and obtains an assessment result of the CCA, where i is a positive integer greater than or equal to 2.

The network device determines the end moment of the $(i-1)^{th}$ backoff time based on the backoff time determined in step 401, and performs the CCA at the end moment of the $(i-1)^{th}$ backoff time.

Optionally, when performing the CCA on the channel, the network device performs energy detection (Energy Detection, ED) on the channel to obtain the assessment result of the CCA. When energy over the channel exceeds an energy threshold, the assessment result of the CCA is that the channel is in a non-idle state. When energy over the channel does not exceed an energy threshold, the assessment result of the CCA is that the channel is in an idle state. A value of the energy threshold is not limited in this embodiment.

Correspondingly, on a terminal device side:

Step 406: The terminal device performs $(i-1)^{th}$ listening on the channel after the end moment of the $(i-1)^{th}$ backoff time, where duration of the listening does not exceed preset listening duration, where i is a positive integer greater than or equal to 2.

Optionally, the network device and the wireless device agree upon duration $L_{cca}$ of each CCA in advance in a communications protocol, and $L_{cca}$ is fixed.

Optionally, the preset listening duration is default duration, or duration preconfigured by the network device.

Optionally, the preset listening duration is greater than duration $L_{cca}$ of a CCA corresponding to each backoff time.

Optionally, the preset listening duration is $L_{cca}+L_{pilot}$, where $L_{pilot}$ is duration occupied by a pilot in a frame.

Step 407: When the assessment result of the $(i-1)^{th}$ CCA is that the channel is in a non-idle state, the network device determines that a start moment of an $i^{th}$ backoff time is a moment corresponding to $ET_{i-1}$, and determines that an end moment of the $i^{th}$ backoff time is a moment corresponding to a sum of $ET_{i-1}$ and $L_i$, where $ET_{i-1}$ is corresponding to an end moment of the $(i-1)^{th}$ CCA, the $(i-1)^{th}$ CCA is a CCA performed at the end moment of the $(i-1)^{th}$ backoff time, and $L_i$ is a length of the $i^{th}$ backoff time.

The network device determines that the end moment of the $(i-1)^{th}$ CCA, that is, the start moment of the $i^{th}$ backoff time, is a moment corresponding to $ET_{i-1}$, and performs an $i^{th}$ backoff. In this case, it is determined that an end moment of the $i^{th}$ backoff time is a moment corresponding to $ET_{i-1}+L_i$.

The network device determines a value of $L_{cca}$ based on the communications protocol, and determines that an end moment of an $i^{th}$ CCA is a moment corresponding to $ET_{i-1}+L_i+L_{cca}$.

The network device performs the $i^{th}$ CCA at the end moment, of the $i^{th}$ backoff time, corresponding to $ET_{i-1}+L_i$, that is, re-performs step 405. In this case, i-1 in step 405 is replaced with i for implementation.

It should be noted that when the assessment result of the $(i-1)^{th}$ CCA is that the channel is in a non-idle state, the network device sends no pilot. Therefore, the terminal device detects no pilot during the $(i-1)^{th}$ listening, either. In other words, when the network device performs the $i^{th}$ backoff, the terminal device is correspondingly in a sleep state in the $i^{th}$ backoff time, and does not wake up until $i^{th}$ listening.

On a terminal device side:

Step 408: When detecting no pilot during the $(i-1)^{th}$ listening, the terminal device determines that the start moment of the $i^{th}$ backoff time is a moment corresponding to $ET_{i-1}$, and determines that the end moment of the $i^{th}$ backoff time is the moment corresponding to the sum of $ET_{i-1}$ and $L_i$.

When detecting no pilot in the preset listening duration of the $(i-1)^{th}$ listening, the terminal device re-enters the sleep state, and determines, based on the start moment, of the $i^{th}$ backoff time, corresponding to $ET_{i-1}$ and the length $L_i$ of the $i^{th}$ backoff time, that the end moment of the $i^{th}$ backoff time is a moment corresponding to $ET_{i-1}+L_i$.

The terminal device determines, based on the communications protocol, duration $L_{cca}$ of the $i^{th}$ CCA performed by the network device, and thereby determines that a start moment of an $(i+1)^{th}$ backoff time is a moment corresponding to $ET_{i-1}+L_i+L_{cca}$.

The terminal device performs the $i^{th}$ listening on the channel after the end moment, of the $i^{th}$ backoff time, corresponding to $ET_{i-1}+L_i$, that is, re-performs step 406. In this case, i-1 in step 406 is replaced with i for implementation.

Figure 5:
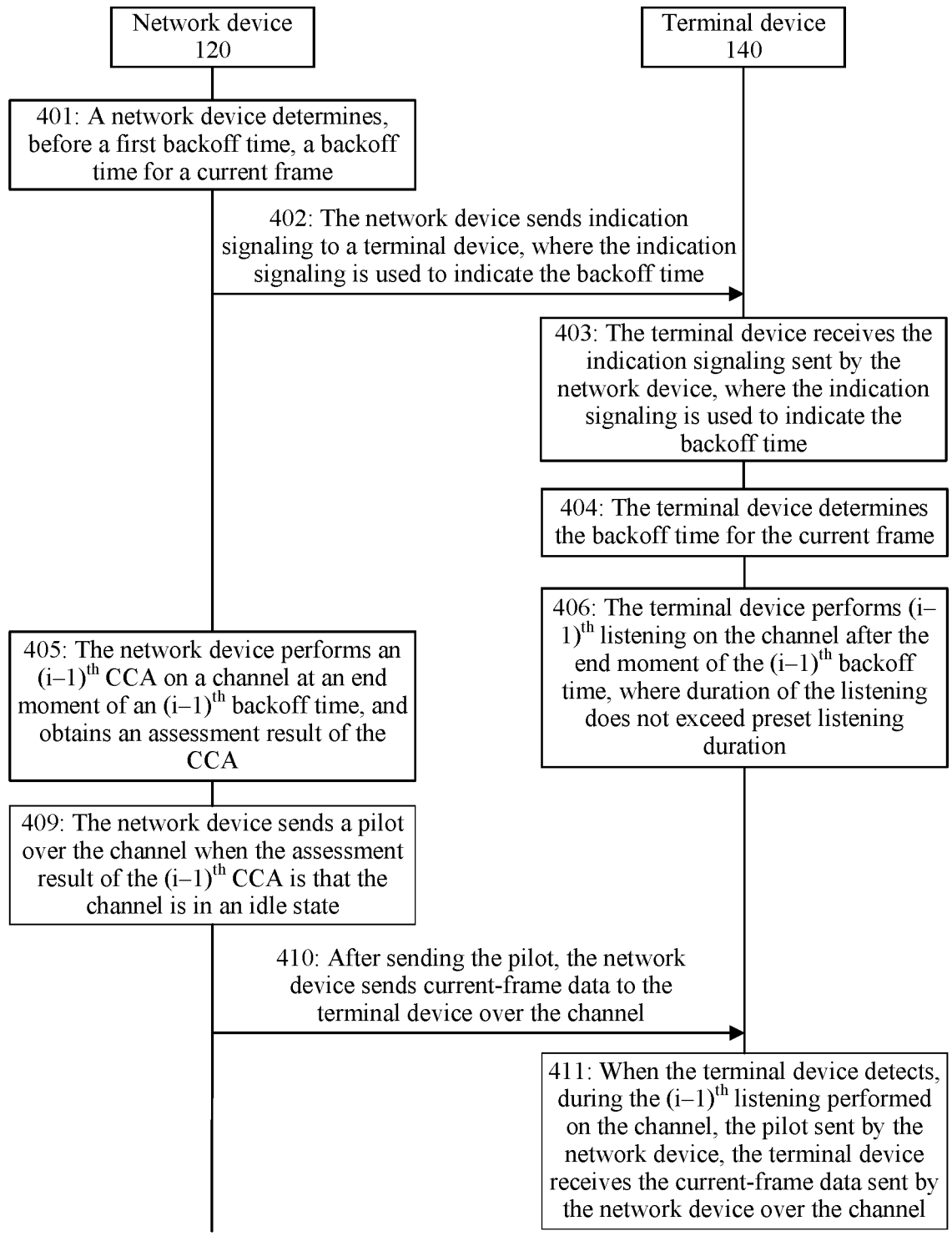
FIG. 5 is a flowchart of a method for sending and receiving information according to another example of an embodiment of the present invention.

Optionally, in another optional embodiment based on the foregoing embodiment, when the assessment result of the $(i-1)^{th}$ CCA performed by the network device is that the channel is in an idle state, the network device sends a pilot. Correspondingly, the terminal device detects the pilot during the $(i-1)^{th}$ listening. In this case, step 407 and step 408 may be replaced with the following steps for implementation, as shown in FIG. 5.

Optionally, the network device and the terminal device are synchronized by using a pilot. The network device and the terminal device may predefine content of the pilot, where content of a pilot used by each network device is different from that of a pilot used by another network device. The terminal device may identify the pilot based on the predefined content of the pilot.

Step 409: The network device sends the pilot over the channel when the assessment result of the $(i-1)^{th}$ CCA is that the channel is in the idle state.

The network device sends, over the channel, the pilot whose content is predefined.

Step 410: After sending the pilot, the network device sends current-frame data to the terminal device over the channel.

Step 411: When the terminal device detects, during the $(i-1)^{th}$ listening performed on the channel, the pilot sent by the network device, the terminal device receives the current-frame data sent by the network device over the channel.

The wireless terminal listens on the channel, and when detecting a pilot that can be identified, receives data after the pilot, that is, current-frame data, over the channel.

Figure 5A:
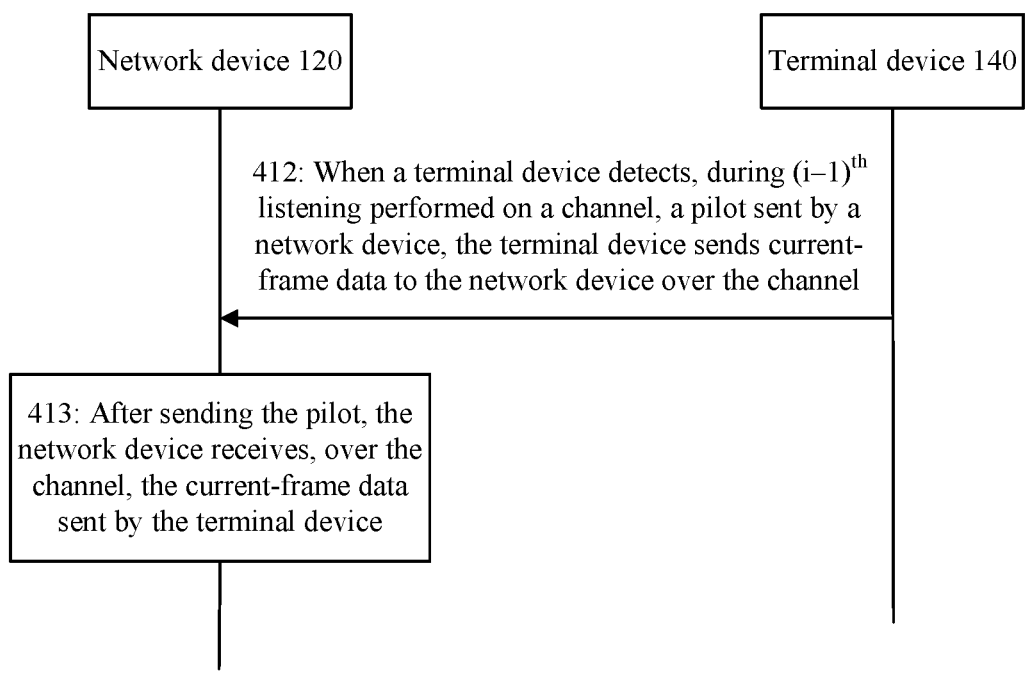
FIG. 5A is a flowchart of a method for sending and receiving information according to another example of an embodiment of the present invention.

Optionally, in another optional embodiment based on the foregoing embodiment, step 410 and step 411 may be replaced with step 412 and step 413 for implementation, as shown in FIG. 5A.

Step 412: When the terminal device detects, during the $(i-1)^{th}$ listening performed on the channel, the pilot sent by the network device, the terminal device sends current-frame data to the network device over the channel.

Step 413: After sending the pilot, the network device receives, over the channel, the current-frame data sent by the terminal device.

Optionally, the network device receives, after a preset receiving interval, the current-frame data sent by the terminal device.

For example, the network device determines that a length of each backoff time for the current frame is 300 ms, the terminal device also determines, based on indication signaling, that the length of each backoff time for the current frame is 300 ms, preset listening duration of the terminal device is 200 ms, and duration of each CCA performed by the network device is 150 ms.

Figure 6:
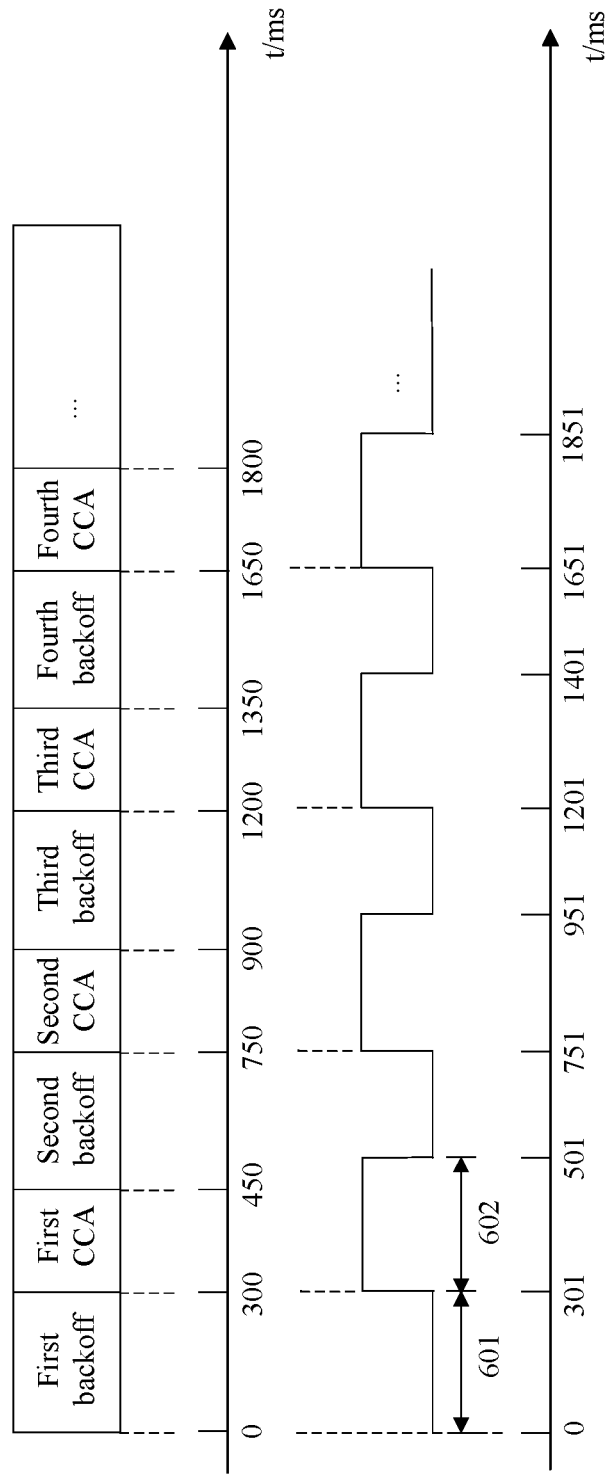
FIG. 6 is a schematic diagram of moments according to another example of an embodiment of the present invention.

In this example, descriptions are provided by using an example in which a time unit is 1 ms, that is, a time difference between a next moment of an end moment and the end moment is 1 ms. In this case, a moment corresponding to a backoff process of the network device and a moment corresponding to a listening process of the terminal device are shown in FIG. 6.

The network device performs the first backoff at a 0 moment. After the first backoff time, the network device performs a first CCA on the channel. In this case, an end moment of the first backoff time, that is, a start moment of the first CCA, is a $300^{th}$ ms. Duration of the CCA is 150 ms. Therefore, an end moment of the first CCA, that is, a start moment of a second backoff time, is a $450^{th}$ ms.

When a result of the first CCA performed by the network device on the channel is that the channel is in the non-idle state, the network device continues to perform a second backoff, and determines that an end moment of a second backoff time, that is, a start moment of a second CCA, is a $750^{th}$ ms.

Correspondingly, the terminal device enters the sleep state at the 0 moment of the current frame, that is, enters the sleep state in a process 601; determines that the end moment of the first backoff time is the $300^{th}$ ms; and performs first listening on the channel at a next moment of the $300^{th}$ ms, that is, a $301^{st}$ ms. Listening duration is 200 ms, that is, the listening lasts until a $501^{st}$ ms. If detecting no pilot, the terminal device terminates the listening. That is, the terminal device keeps listening in a process 602.

If detecting no pilot in a first listening process, the terminal device re-enters the sleep state, that is, re-experiences the process denoted by 601; determines, based on the duration of the CCA and a length of the second backoff time, that the end moment of the second backoff time is the $750^{th}$ ms; and starts second listening, that is, starts to re-experience the process denoted by 602, at a next moment of the $750^{th}$ ms, that is, a $751^{st}$ ms.

The network device backs off by using the foregoing method, and the terminal device listens on the channel by using the foregoing method. Another process is shown in FIG. 6, and details are not described in this embodiment.

To sum up, according to the method for sending and receiving information provided in this embodiment of the present invention, the terminal device receives the indication signaling sent by the network device, where the indication signaling includes the length of each backoff time; determines the length of each backoff time of the network device; and starts listening on the channel at the end moment of the backoff time of the network device, that is, starts listening at a moment at which the network device possibly sends a pilot or data to the terminal device. In a time period in which it is impossible for the network device to send a pilot or data to the terminal device, the terminal device does not listen on the channel, or enters the sleep state. This reduces duration of listening on the channel by the terminal device, and reduces battery electricity consumption of the terminal device caused by listening.

Optionally, in another optional embodiment based on the foregoing embodiment, the channel is always in a busy state in a time period, and after the network device performs a plurality of backoffs, a CCA result is still that the channel is in the non-idle state. In this case, even if the network device continues to back off, the network device still cannot use the channel.

In this optional embodiment, a maximum quantity $N_{max}$ of backoffs performed by the network device for the current frame is preset. When the network device still cannot use the channel after performing $N_{max}$ backoffs, the network device gives up sending or receiving the current-frame data.

The network device determines a maximum quantity $N_{max}$ of backoff time for the current frame, and sends the maximum quantity to the terminal device by using the indication signaling, so that when the terminal device still does not detect the pilot during $N_{max}^{th}$ listening, the terminal device gives up sending or receiving the current-frame data.

That is, the indication signaling further includes the maximum quantity $N_{max}$ of backoff time.

Figure 7A:
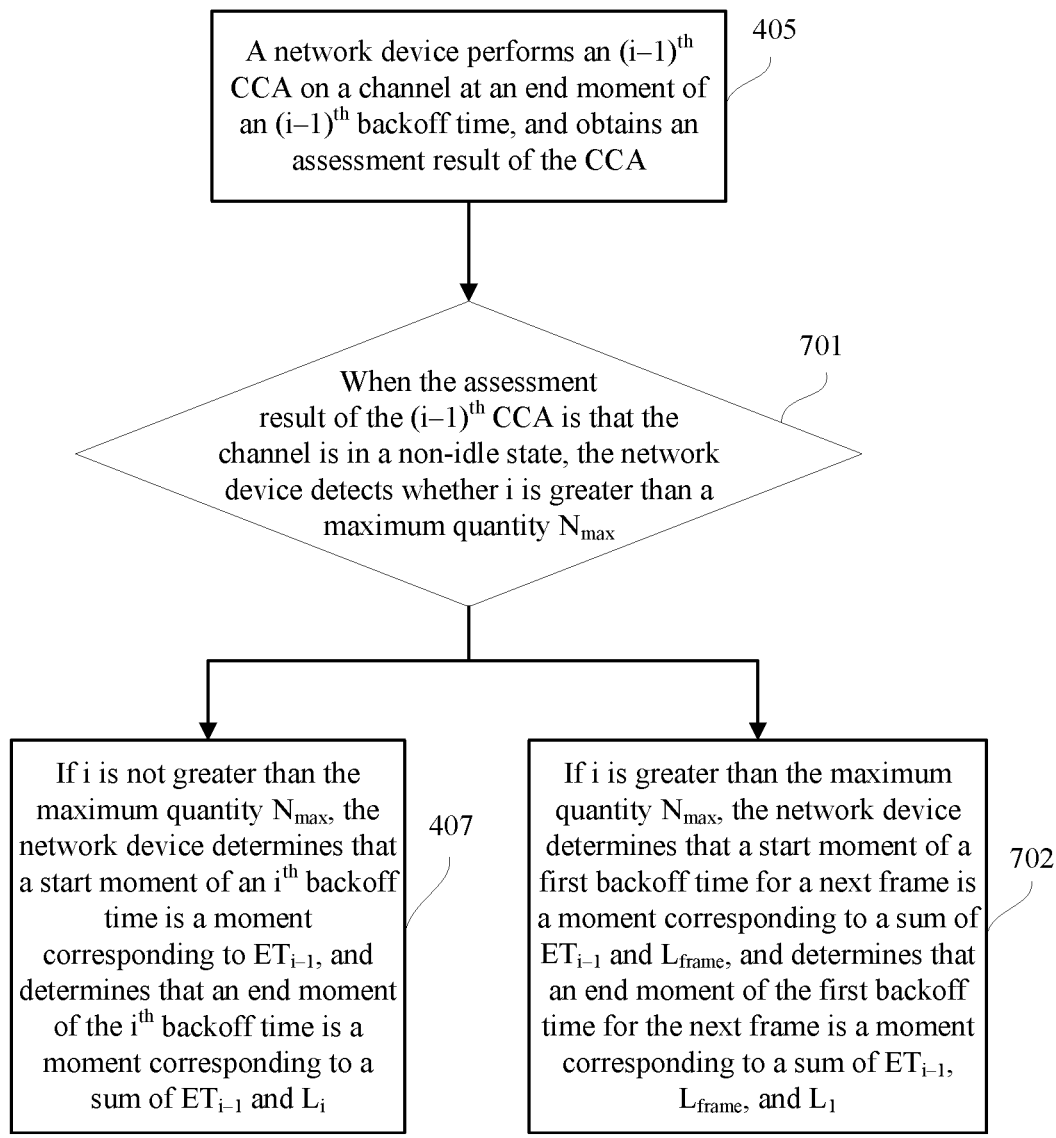
FIG. 7A is a flowchart of a method for sending and receiving information according to another example of an embodiment of the present invention.

Therefore, in the embodiment shown in FIG. 4, after step 405, step 701 and step 702 are further included, as shown in FIG. 7A.

Step 701: When the assessment result of the $(i-1)^{th}$ CCA is that the channel is in the non-idle state, the network device detects whether i is greater than the maximum quantity $N_{max}$.

The $(i-1)^{th}$ CCA is a CCA performed at the end moment of the $(i-1)^{th}$ backoff time, and i is a positive integer greater than or equal to 2.

If i is not greater than the maximum quantity $N_{max}$, step 407 is performed.

If i is greater than the maximum quantity $N_{max}$, step 702 is performed.

Step 702: If i is greater than the maximum quantity $N_{max}$, the network device determines that a start moment of a first backoff time for a next frame is a moment corresponding to a sum of $ET_{i-1}$ and $L_{frame}$, and determines that an end moment of the first backoff time for the next frame is a moment corresponding to a sum of $ET_{i-1}$, $L_{frame}$, and $L_1$.

$L_{frame}$ is duration of one frame, $L_1$ is a length of the first backoff time for the next frame, and i is a positive integer greater than or equal to 2.

Optionally, if each backoff time for the next frame is the same as each backoff time for the current frame, the network device starts a first backoff at the start moment of the first backoff time for the next frame.

If each backoff time for the next frame is not the same as each backoff time for the current frame, the network device determines each backoff time for the next frame, that is, re-performs step 401, at the start moment of the first backoff time for the next frame or before the start moment of the first backoff time for the next frame. A moment at which the network device determines the backoff time for the next frame is not limited in this embodiment.

Figure 7B:
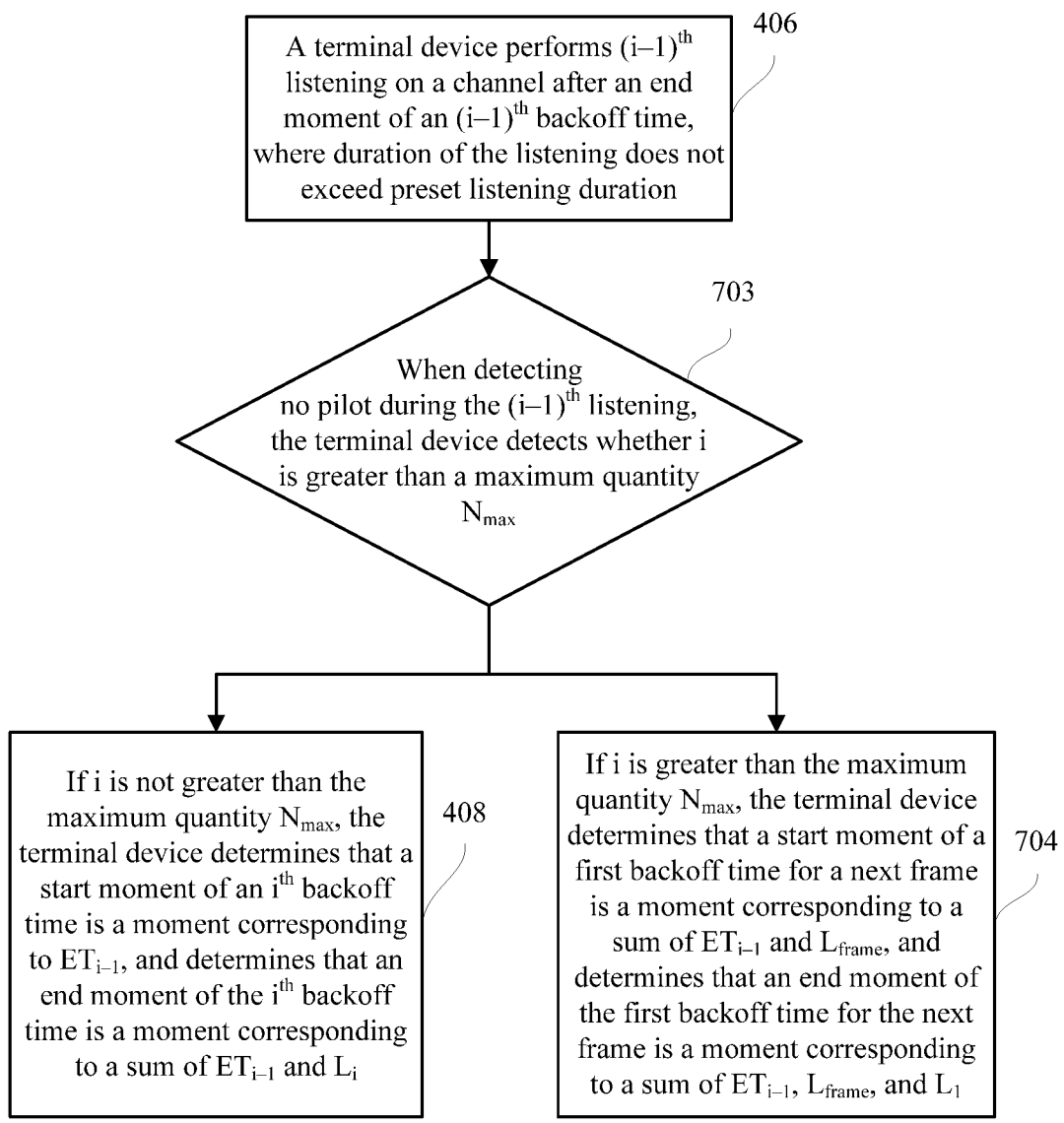
FIG. 7B is a flowchart of a method for sending and receiving information according to another example of an embodiment of the present invention.

Correspondingly, when the terminal device detects no pilot during the $(i-1)^{th}$ listening, after step 406, step 703 and step 704 are further included, as shown in FIG. 7B.

Step 703: When detecting no pilot during the $(i-1)^{th}$ listening, the terminal device detects whether i is greater than the maximum quantity $N_{max}$.

The $(i-1)^{th}$ CCA is a CCA performed at the end moment of the $(i-1)^{th}$ backoff time, and i is a positive integer greater than or equal to 2.

If i is not greater than the maximum quantity $N_{max}$, the terminal device performs step 408.

If i is greater than the maximum quantity $N_{max}$, the terminal device performs step 704.

Step 704: If i is greater than the maximum quantity $N_{max}$, the terminal device determines that a start moment of a first backoff time for a next frame is a moment corresponding to a sum of $ET_{i-1}$ and $L_{frame}$, and determines that an end moment of the first backoff time for the next frame is a moment corresponding to a sum of $ET_{i-1}$, $L_{frame}$, and $L_1$.

$L_{frame}$ is duration of one frame, $L_1$ is a length of the first backoff time for the next frame, and i is a positive integer greater than or equal to 2.

Optionally, if each backoff time for the next frame is the same as each backoff time for the current frame, the terminal device sleeps until the end moment of the first backoff time for the next frame, and then starts to perform first listening on the channel.

If each backoff time for the next frame is not the same as each backoff time for the current frame, the terminal device receives, at the start moment of the first backoff time for the next frame or before the start moment of the first backoff time for the next frame, the indication signaling sent by the network device, and determines each backoff time for the next frame, that is, re-performs step 403. A moment at which the terminal device determines the backoff time for the next frame is not limited in this embodiment.

To sum up, according to the method for sending and receiving information provided in this embodiment of the present invention, the network device determines the maximum quantity $N_{max}$ of backoff time, and sends the maximum quantity $N_{max}$ of backoff time to the terminal device by using the indication signaling. When the assessment result of the $N_{max}^{th}$ CCA performed by the network device is still that the channel is in the non-idle state, the network device gives up sending the current-frame data, and directly performs a backoff for the next frame. This avoids a problem that the network device spends excessively much time on an LBT process for the current frame and delays next-frame data communication.

Optionally, in another optional embodiment based on the foregoing embodiment, when there are N backoff time for the current frame, and lengths $L_1, L_2, L_3, \ldots,$ and $L_N$ of the backoff time for the current frame are different, after determining the backoff time for the current frame, the network device sends a length of each backoff time to the terminal device by using indication signaling.

That is, the indication signaling includes the length of each of the N backoff time, where N is a positive integer.

For example, there are five backoff time for the current frame, and the network device sends, by using the indication signaling, each of lengths of the backoff time: 300 ms, 200 ms, 500 ms, 250 ms, and 700 ms.

Optionally, in another optional embodiment based on the foregoing embodiment, if the network device performs a relatively large quantity of backoffs for the current frame, that is, when a quantity N of backoff time for the current frame is quite large, and if the network device sends a length of each backoff time to the terminal device by using signaling, a large quantity of signaling resources are used.

Optionally, the network device sends a length of a first backoff time and a relationship between a length of another backoff time and the length of the first backoff time to the terminal device by using the indication signaling.

In this case, the indication signaling includes: a length of a specified backoff time of the N backoff time, and a length relationship between the specified backoff time and a backoff time of the N backoff time except the specified backoff time, where the length relationship is an index relationship, a multiple relationship, or an arithmetic sequence relationship, and N is a positive integer.

The network device sends the indication signaling to the terminal device before the first backoff time.

In this case, determining each backoff time by the terminal device, that is, step 404, is implemented as follows: The terminal device determines the length of each backoff time based on the length of the specified backoff time and the length relationship between the specified backoff time and the backoff time of the N backoff time except the specified backoff time in the received indication signaling.

For example, the quantity N of backoff time of the network device for the current frame is 50. The network device sends, by using the indication signaling, information indicating that a length $L_1$ of a first backoff time is 100 ms, and sends, to the terminal device by using the indication signaling, information indicating that a length relationship between backoff time is an arithmetic sequence relationship and a common difference is 10 ms. In this way, to indicate the backoff time to the terminal device, the network device needs to use only two pieces of indication signaling instead of using 50 pieces of indication signaling. After receiving the indication signaling, the terminal device can determine that lengths of the backoff time are 100 ms, 110 ms, 120 ms, 130 ms, and so on.

To sum up, according to the method for sending and receiving information provided in this embodiment of the present invention, the terminal device obtains, by using the indication signaling sent by the network device, the length of the specified backoff time of the N backoff time and the length relationship between the specified backoff time and the another backoff time of the N backoff time. The terminal device may calculate and determine the length of each backoff time by using the relationship between the length of the specified backoff time and the length of the another backoff time, instead of determining the length of each backoff time by receiving each backoff time sent by the network device. This reduces a quantity of pieces of indication signaling sent by the network device to the terminal device, and reduces occupied channel resources.

Optionally, in another optional embodiment based on the foregoing embodiment, because the network device may send the pilot only after the CCA is completed and the assessment result is obtained, it is impossible for the terminal device to detect the pilot in a process of performing the CCA by the network device. Therefore, the terminal device may also enter the sleep state in the process of performing the CCA by the network device.

The network device may send duration $L_{cca}$ of each CCA to the terminal device by using the indication signaling, so that the terminal device determines the duration of each CCA and starts listening on the channel only after an end moment of the CCA.

In this case, the indication signaling sent by the network device to the terminal device further includes duration $L_{cca}$ of a CCA corresponding to each backoff time.

Optionally, CCAs corresponding to the backoff time have different duration $L_{cca}$.

Figure 8:
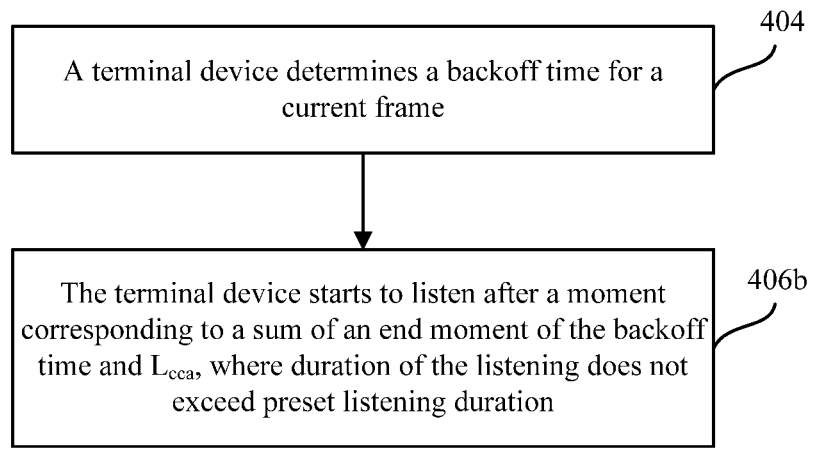
FIG. 8 is a flowchart of a method for sending and receiving information according to another example of an embodiment of the present invention.

In this case, when listening on the channel, the terminal device may start listening after the end moment of the CCA, that is, step 406 may be replaced with step 406b for implementation, as shown in FIG. 8.

Step 406b: The terminal device starts listening after a moment corresponding to a sum of an end moment of a backoff time and $L_{cca}$, where duration of the listening does not exceed preset listening duration.

$L_{cca}$ is the duration of the CCA corresponding to the backoff time, and the preset listening duration is default duration, or duration preconfigured by the network device.

Optionally, the terminal device starts listening after the network device ends the $i^{th}$ CCA, and the preset listening duration is duration $L_{pilot}$ occupied by a pilot in a frame.

For example, the network device determines that the length of each backoff time for the current frame is 300 ms, the terminal device also determines, by using indication signaling, that the length of each backoff time for the current frame is 300 ms, the preset listening duration of the terminal device is 50 ms, and duration of each CCA performed by the network device is 150 ms.

Figure 9:
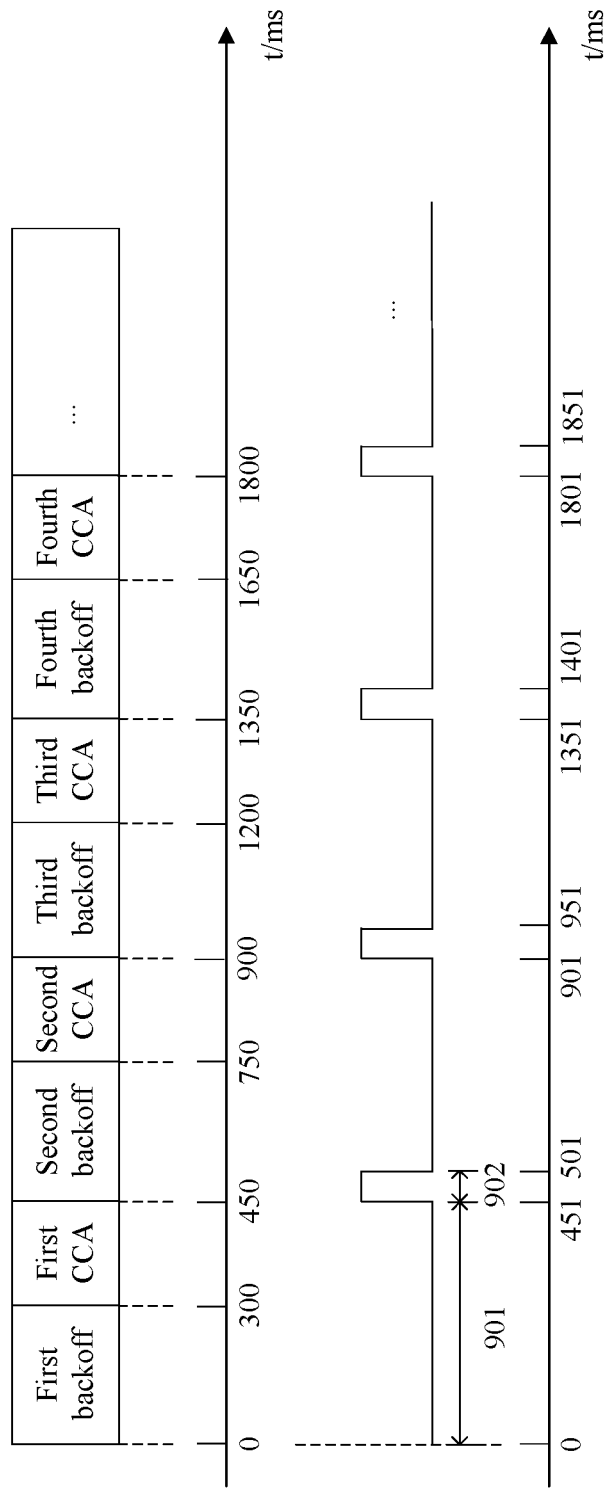
FIG. 9 is a schematic diagram of moments according to another example of an embodiment of the present invention.

In this example, descriptions are provided by using an example in which a time unit is 1 ms, that is, a time difference between a next moment of an end moment and the end moment is 1 ms. In this case, a moment corresponding to a backoff process of the network device and a moment corresponding to a listening process of the terminal device are shown in FIG. 9.

The network device performs the first backoff at a 0 moment. After the first backoff time, the network device performs a first CCA on the channel. In this case, an end moment of the first backoff time, that is, a start moment of the first CCA, is a $300^{th}$ ms. Duration of the CCA is 150 ms. Therefore, an end moment of the first CCA, that is, a start moment of a second backoff time, is a $450^{th}$ ms.

When a result of the first CCA performed by the network device on the channel is that the channel is in the non-idle state, the network device continues to perform a second backoff, and determines that an end moment of a second backoff time, that is, a start moment of a second CCA, is a $750^{th}$ ms.

Correspondingly, the terminal device enters the sleep state at the 0 moment of the current frame, that is, enters the sleep state in a process 901; determines that a moment corresponding to a sum of the end moment of the first backoff time and $L_{cca}$ is the $450^{th}$ ms; and starts to perform first listening on the channel after the $450^{th}$ ms, that is, at a next moment or a $451^{st}$ ms. Listening duration is 50 ms, that is, the listening lasts until a $501^{st}$ ms. If detecting no pilot, the terminal device terminates the listening. That is, the terminal device keeps listening in a process 902.

If detecting no pilot in a first listening process, the terminal device re-enters the sleep state, that is, re-experiences the process denoted by 901; determines, based on the duration of the CCA and a length of the second backoff time, that a moment corresponding to a sum of the end moment of the second backoff time and $L_{cca}$ is a $900^{th}$ ms; and starts second listening, that is, starts to re-experience the process denoted by 902, after the $900^{th}$ ms, that is, at a next moment or a $901^{st}$ ms.

The network device backs off by using the foregoing method, and the terminal device listens on the channel by using the foregoing method. Another process is shown in FIG. 9, and details are not described in this embodiment.

To sum up, according to the method for sending and receiving information provided in this embodiment of the present invention, the network device also sends, by using the indication signaling, the duration of a CCA corresponding to each backoff time to the terminal device. The terminal device determines a length of the backoff time and the duration of the corresponding CCA, and starts listening on the terminal device at an end moment of the CCA. This further reduces duration of listening on the channel by the terminal device, and further reduces battery electricity consumption of the terminal device caused by listening.

The following are apparatus embodiments of the present invention, and may be used to perform the method embodiments of the present invention. For details not disclosed in the apparatus embodiments of the present invention, reference may be made to the method embodiments of the present invention.

Figure 10:
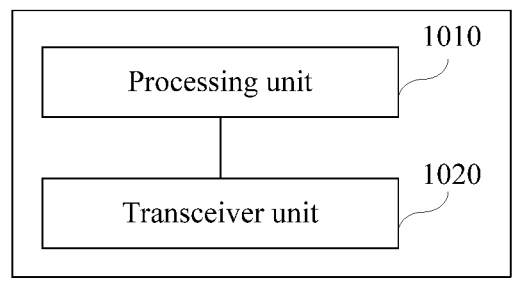
FIG. 10 is a block diagram of an apparatus for sending and receiving information according to an example of an embodiment of the present invention.

Referring to FIG. 10, FIG. 10 is a structural block diagram of an apparatus for sending and receiving information according to an embodiment of the present invention. The apparatus has a function of implementing behaviors of the network device in the foregoing method design. The apparatus for sending and receiving information may include:

a processing unit 1010, configured to determine a backoff time for a current frame, where the processing unit 1010 is further configured to perform a CCA on a channel at an end moment of the determined backoff time for the current frame, and obtain an assessment result of the CCA; and a transceiver unit 1020, configured to: when the assessment result of the CCA obtained by the processing unit 1010 is that the channel is in an idle state, send a pilot over the channel; and after sending the pilot, send current-frame data to a terminal device over the channel, or receive, over the channel, current-frame data sent by a terminal device.

An entity apparatus corresponding to the processing unit 1010 is a processor, and an entity apparatus corresponding to the transceiver unit 1020 is a transceiver.

The processor includes one or more processing cores, configured to execute various function applications and data processing.

The transceiver may be implemented as a communications component. The communications component may be a communications chip. The communications chip may include a receiving module, a transmit module, a modem module, and the like, configured to modulate and demodulate data or information and receive or send the data or information by using a radio signal.

Optionally, the apparatus for sending and receiving information further includes a memory.

The memory is connected to the processor, and is configured to store a software program and a module.

The memory may be implemented as any type of volatile or nonvolatile storage device or a combination thereof, for example, a static random access memory (SRAM), an electrically erasable programmable read-only memory (EEPROM), an erasable programmable read only memory (EPROM), a programmable ROM (PROM), a read-only memory (ROM), a magnetic memory, a flash memory, a magnetic disk, or an optical disc.

For related details, refer to the foregoing method embodiment.

For beneficial effects of this embodiment, refer to beneficial effects of the foregoing method embodiment. Details are not described herein again.

Figure 11:
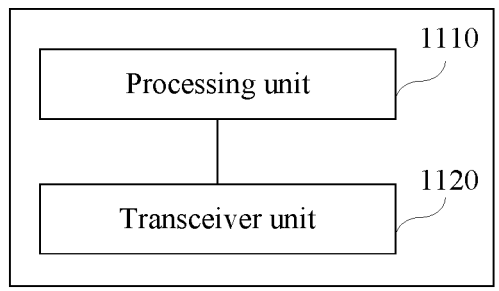
FIG. 11 is a block diagram of an apparatus for sending and receiving information according to an example of an embodiment of the present invention.

Referring to FIG. 11, FIG. 11 is a structural block diagram of an apparatus for sending and receiving information according to an embodiment of the present invention. The apparatus has a function of implementing behaviors of the terminal device in the foregoing method design. The apparatus for sending and receiving information may include:

a processing unit 1110, configured to determine a backoff time for a current frame, where the backoff time is a backoff time before a network device performs a CCA, where the processing unit 1110 is further configured to listen on a channel based on the backoff time for the current frame; and a transceiver unit 1120, configured to: if the processing unit detects, over the channel, a pilot sent by the network device, receive current-frame data sent by the network device over the channel, or send current-frame data to the network device over the channel.

An entity apparatus corresponding to the processing unit 1110 is a processor, and an entity apparatus corresponding to the transceiver unit 1120 is a transceiver.

The processor includes one or more processing cores, configured to execute various function applications and data processing.

The transceiver may be implemented as a communications component. The communications component may be a communications chip. The communications chip may include a receiving module, a transmit module, a modem module, and the like, configured to modulate and demodulate data or information and receive or send the data or information by using a radio signal.

Optionally, the apparatus for sending and receiving information further includes a memory.

The memory is connected to the processor, and is configured to store a software program and a module.

The memory may be implemented as any type of volatile or nonvolatile storage device or a combination thereof, for example, a static random access memory (SRAM), an electrically erasable programmable read-only memory (EEPROM), an erasable programmable read only memory (EPROM), a programmable ROM (PROM), a read-only memory (ROM), a magnetic memory, a flash memory, a magnetic disk, or an optical disc.

For related details, refer to the foregoing method embodiment.

For beneficial effects of this embodiment, refer to beneficial effects of the foregoing method embodiment. Details are not described herein again.

In another optional embodiment, the network device sends the backoff time to the terminal device by using indication signaling, there are at least two backoff time for the current frame, and an assessment result of an $(i-1)^{th}$ CCA performed by the network device is that the channel is in a non-idle state.

The processing unit 1010 is configured to determine, before a first backoff time, the backoff time for the current frame.

The transceiver unit 1020 is further configured to send the indication signaling to the terminal device, where the indication signaling is used to indicate the backoff time for the current frame determined by the processing unit 1010, and the indication signaling includes: a length of each of N backoff time, where N is a positive integer; or a length of a specified backoff time of N backoff time, and a length relationship between the specified backoff time and a backoff time of the N backoff time except the specified backoff time, where the length relationship is an index relationship, a multiple relationship, or an arithmetic sequence relationship, and N is a positive integer.

The processing unit 1010 is further configured to perform the $(i-1)^{th}$ CCA on the channel at an end moment of an $(i-1)^{th}$ backoff time, and obtain an assessment result of the CCA.

The processing unit 1010 is further configured to: when the assessment result of the $(i-1)^{th}$ CCA is that the channel is in the non-idle state, determine that a start moment of an $i^{th}$ backoff time is a moment corresponding to $ET_{i-1}$, and determine that an end moment of the $i^{th}$ backoff time is a moment corresponding to a sum of $ET_{i-1}$ and $L_i$, where $ET_{i-1}$ is corresponding to an end moment of the $(i-1)^{th}$ CCA, the $(i-1)^{th}$ CCA is a CCA performed at the end moment of the $(i-1)^{th}$ backoff time, $L_i$ is a length of the $i^{th}$ backoff time, and i is a positive integer greater than or equal to 2.

For related details, refer to the foregoing method embodiment.

In another optional embodiment, the terminal device determines the backoff time by receiving indication signaling sent by the network device, there are at least two backoff time for the current frame, and the terminal device does not detect the pilot during $(i-1)^{th}$ listening.

The transceiver unit 1120 is configured to receive the indication signaling sent by the network device, where the indication signaling is used to indicate the backoff time, and the indication signaling includes: a length of each of N backoff time, where N is a positive integer; or a length of a specified backoff time of N backoff time, and a length relationship between the specified backoff time and a backoff time of the N backoff time except the specified backoff time, where the length relationship is an index relationship, a multiple relationship, or an arithmetic sequence relationship, and N is a positive integer.

The processing unit 1110 is configured to determine the backoff time for the current frame.

The processing unit 1110 is further configured to perform the $(i-1)^{th}$ listening after the end moment of the $(i-1)^{th}$ backoff time, where duration of the listening does not exceed preset listening duration, and the preset listening duration is default duration, or duration preconfigured by the network device.

The processing unit 1110 is further configured to: when the pilot is not detected during the $(i-1)^{th}$ listening, determine that a start moment of an $i^{th}$ backoff time is a moment corresponding to $ET_{i-1}$, and determine that an end moment of the $i^{th}$ backoff time is a moment corresponding to a sum of $ET_{i-1}$ and $L_i$, where $ET_{i-1}$ is corresponding to an end moment of the $(i-1)^{th}$ CCA, the $(i-1)^{th}$ CCA is a CCA performed at the end moment of the $(i-1)^{th}$ backoff time, $L_i$ is a length of the $i^{th}$ backoff time, and i is a positive integer greater than or equal to 2.

For related details, refer to the foregoing method embodiment.

For beneficial effects of this embodiment, refer to beneficial effects of the foregoing method embodiment. Details are not described herein again.

In still another optional embodiment, the network device sends the backoff time to the terminal device by using indication signaling, there are at least two backoff time for the current frame, and an assessment result of an $(i-1)^{th}$ CCA performed by the network device is that the channel is in an idle state.

The transceiver unit 1020 is further configured to send the pilot over the channel when the assessment result of the $(i-1)^{th}$ CCA is that the channel is in the idle state.

The transceiver unit 1020 is further configured to: after sending the pilot, send current-frame data to the terminal device over the channel, or receive, over the channel, current-frame data sent by the terminal device.

For related details, refer to the foregoing method embodiment.

In still another optional embodiment, the terminal device determines the backoff time by receiving indication signaling sent by the network device, there are at least two backoff time for the current frame, and the terminal device detects the pilot during $(i-1)^{th}$ listening.

The transceiver unit 1120 is further configured to: when the processing unit 1110 detects, over the channel, the pilot sent by the network device, receive current-frame data sent by the network device over the channel, or send current-frame data to the network device over the channel.

For related details, refer to the foregoing method embodiment.

For beneficial effects of this embodiment, refer to beneficial effects of the foregoing method embodiment. Details are not described herein again.

In still another optional embodiment, the indication signaling sent by the network device to the terminal device by using the transceiver unit 1020 further includes a maximum quantity $N_{max}$ of backoff time.

The processing unit 1010 is further configured to: when the assessment result of the $(i-1)^{th}$ CCA is that the channel is in the non-idle state, detect whether i is greater than the maximum quantity $N_{max}$.

The processing unit 1010 is further configured to: if i is not greater than the maximum quantity $N_{max}$, determine that a start moment of an $i^{th}$ backoff time is a moment corresponding to $ET_{i-1}$ and an end moment of the $i^{th}$ backoff time is a moment corresponding to a sum of $ET_{i-1}$ and $L_i$.

The processing unit 1010 is further configured to: if i is greater than the maximum quantity $N_{max}$, determine that a start moment of a first backoff time for a next frame is a moment corresponding to a sum of $ET_{i-1}$ and $L_{frame}$, and determine that an end moment of the first backoff time for the next frame is a moment corresponding to a sum of $ET_{i-1}$, $L_{frame}$, and $L_1$, where $L_{frame}$ is duration of one frame, $L_1$ is a length of the first backoff time for the next frame, and i is a positive integer greater than or equal to 2.

For related details, refer to the foregoing method embodiment.

In still another optional embodiment, the indication signaling that is received by the terminal device by using the transceiver unit 1120 and that is sent by the network device further includes a maximum quantity $N_{max}$ of backoff time.

The processing unit 1110 is further configured to: when the pilot is not detected during the $(i-1)^{th}$ listening, detect whether i is greater than the maximum quantity $N_{max}$.

The processing unit 1110 is further configured to: if i is not greater than the maximum quantity $N_{max}$, determine that a start moment of an $i^{th}$ backoff time is a moment corresponding to $ET_{i-1}$ and an end moment of the $i^{th}$ backoff time is a moment corresponding to a sum of $ET_{i-1}$ and $L_i$.

The processing unit 1110 is further configured to: if i is greater than the maximum quantity $N_{max}$, determine that a start moment of a first backoff time for a next frame is a moment corresponding to a sum of $ET_{i-1}$ and $L_{frame}$, and determine that an end moment of the first backoff time for the next frame is a moment corresponding to a sum of $ET_{i-1}$, $L_{frame}$, and $L_1$, where $L_{frame}$ is duration of one frame, $L_1$ is a length of the first backoff time for the next frame, and i is a positive integer greater than or equal to 2.

For related details, refer to the foregoing method embodiment.

For beneficial effects of this embodiment, refer to beneficial effects of the corresponding method embodiment. Details are not described herein again.

In still another optional embodiment, the indication signaling sent by the network device to the terminal device by using the transceiver unit 1020 further includes duration $L_{cca}$ of a CCA corresponding to each backoff time.

The processing unit 1110 is further configured to start listening after a moment corresponding to a sum of the end moment of the backoff time and $L_{cca}$, where duration of the listening does not exceed preset listening duration, $L_{cca}$ is duration of the CCA corresponding to the backoff time, and the preset listening duration is default duration, or duration preconfigured by the network device.

For related details, refer to the foregoing method embodiment.

It should be noted that an entity apparatus corresponding to the processing unit 1010 is a processor, an entity apparatus corresponding to the transceiver unit 1020 is a transceiver, an entity apparatus corresponding to the processing unit 1110 is a processor, and an entity apparatus corresponding to the transceiver unit 1120 is a transceiver.

For beneficial effects of this embodiment, refer to beneficial effects of the corresponding method embodiment. Details are not described herein again.

Figure 12:
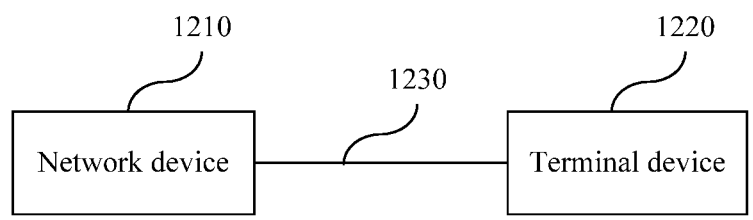
FIG. 12 is a block diagram of a system for sending and receiving information according to an example of an embodiment of the present invention.

Referring to FIG. 12, FIG. 12 is a structural block diagram of a system for sending and receiving information according to an embodiment of the present invention. The system for sending and receiving information includes a network device 1210 and a terminal device 1220. A communications connection is established between the network device 1210 and the terminal device 1220 by using a channel 1230.

The network device 1210 is configured to determine a backoff time for a current frame.

The network device 1210 is further configured to perform a CCA on the channel 1230 at an end moment of the backoff time, and obtain an assessment result of the CCA.

The terminal device 1220 is configured to determine the backoff time for the current frame, where the backoff time is a backoff time before the network device 1210 performs the CCA.

The terminal device 1220 is further configured to listen on the channel 1230 based on the backoff time.

The network device 1210 is further configured to send a pilot over the channel 1230 when the assessment result of the CCA is that the channel 1230 is in an idle state.

The network device 1210 is further configured to: after sending the pilot, send current-frame data to the terminal device 1220 over the channel 1230, or receive, over the channel 1230, current-frame data sent by the terminal device 1220.

The terminal device 1220 is further configured to: if detecting, over the channel 1230, the pilot sent by the network device 1210, receive current-frame data sent by the network device 1210 over the channel 1230, or send current-frame data to the network device 1210 over the channel 1230.

To sum up, according to the apparatus for sending and receiving information provided in the embodiments of the present invention, the network device and the terminal device determine the backoff time for the current frame; the network device performs the CCA on the channel at the end moment of the backoff time, and obtains the assessment result of the CCA; the terminal device listens on the channel based on the backoff time; the network device sends the pilot over the channel when the assessment result of the CCA is that the channel is in the idle state, and sends or receives the current-frame data after sending the pilot; the terminal device sends or receives the current-frame data after detecting the pilot. In this way, the terminal device listens on the channel only when the network device possibly sends the pilot or data to the terminal device. In a time period in which it is impossible for the network device to send the pilot or data to the terminal device, the terminal device does not listen on the channel, or enters a sleep state. This reduces duration of listening on the channel by the terminal device, and reduces battery electricity consumption of the terminal device caused by listening.

To sum up, according to the apparatus for sending and receiving information provided in the embodiments of the present invention, the network device determines the maximum quantity $N_{max}$ of backoff time, and sends the maximum quantity $N_{max}$ of backoff time to the terminal device by using the indication signaling. When the assessment result of the $N_{max}^{th}$ CCA performed by the network device is still that the channel is in the non-idle state, the network device gives up sending the current-frame data, and directly performs a backoff for the next frame. This avoids a problem that the network device spends excessively much time on an LBT process for the current frame and delays next-frame data communication.

To sum up, according to the apparatus for sending and receiving information provided in the embodiments of the present invention, the terminal device obtains, by using the indication signaling sent by the network device, the length of the specified backoff time of the N backoff time and the length relationship between the specified backoff time and the another backoff time of the N backoff time. The terminal device may calculate and determine the length of each backoff time by using the relationship between the length of the specified backoff time and the length of the another backoff time, instead of determining the length of each backoff time by receiving each backoff time sent by the terminal device. This reduces a quantity of pieces of indication signaling sent by the network device to the terminal device, and reduces occupied channel resources.

To sum up, according to the apparatus for sending and receiving information provided in the embodiments of the present invention, the network device also sends, by using the indication signaling, the duration of a CCA corresponding to each backoff time to the terminal device. The terminal device determines a length of the backoff time and the duration of the corresponding CCA, and starts listening on the terminal device at an end moment of the CCA. This further reduces duration of listening on the channel by the terminal device, and further reduces battery electricity consumption of the terminal device caused by listening.

It should be noted that, for sending and receiving information by the apparatus for sending and receiving information and the terminal that are provided in the foregoing embodiments, descriptions are provided by using only division of the foregoing functional units as an example. In actual application, the functions may be allocated, depending on a requirement, to different functional units for implementation. To be specific, an internal structure of the device is divided into different functional units to complete all or a part of the functions described above. In addition, the apparatus for sending and receiving information provided in the foregoing embodiments is based on a same idea as the embodiments of the method for sending and receiving information. For a specific implementation process, refer to the method embodiments. Details are not described herein again.

It should be understood that, unless an exceptional case is explicitly supported in context, a singular form "a" ("a", "an", and "the") used in this specification is intended to include a plural form. It should be further understood that "and/or" used in this specification intends to include any and all possible combinations of one or more associatively listed items.

Sequence numbers of the foregoing embodiments of the present invention are merely intended for illustrative purposes, but do not indicate priorities of the embodiments.

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, an optical disc, or the like.

The foregoing descriptions are merely examples of embodiments of the present invention, but are not intended to limit the present invention. Any modification, equivalent replacement, and improvement made without departing from the spirit and principle of the present invention shall fall within the protection scope of the present invention.

What is claimed is:

1. A method for sending and receiving information, comprising:
    determining, by a network device, a backoff time for a current frame, wherein the backoff time is previously agreed upon by the network device and a terminal device in a communications protocol;
    performing, by the network device, a clear channel assessment (CCA) on a channel at an end moment of the backoff time, and obtaining, by the network device, an assessment result of the CCA;
    sending, by the network device, a pilot over the channel when the assessment result indicates that the channel is in an idle state; and
    sending, by the network device, current-frame data to a terminal device over the channel, or receiving, by the network device, over the channel, current-frame data sent by a terminal device.

2. The method according to claim 1, wherein after determining, by the network device, the backoff time for a current frame, and before the performing a clear channel assessment CCA on a channel at an end moment of the backoff time, the method further comprises:
    sending, by the network device to the terminal device, indication signaling indicating the backoff time.

3. The method according to claim 2, wherein the indication signaling comprises information indicating N backoff time and at least one of the following:
    a length for each of the N backoff time; or
    a length for a particular backoff time in the N backoff time and length information indicating how to obtain lengths for other backoff time in the N backoff time using the particular backoff time, wherein the length information includes an index relationship, a multiple relationship, or an arithmetic sequence relationship between the particular backoff time and the other backoff time in the N backoff time; and, wherein N is a positive integer.

4. The method according to claim 3, wherein the indication signaling further comprises:
    duration $L_{cca}$ of a CCA corresponding to each backoff time in the N backoff time.

5. The method according to claim 3, wherein the indication signaling further comprises:
    information a maximum quantity $N_{max}$ of the N backoff time.

6. A method for sending and receiving information, comprising:
    determining, by a terminal device, a backoff time for a current frame, wherein the backoff time is a backoff time before a network device performs a clear channel assessment (CCA) and is previously agreed upon by the network device and a terminal device in a communications protocol;
    listening, by the terminal device, on a channel based on the backoff time; and
    when the terminal device detects, over the channel, a pilot sent by the network device, receiving, by the terminal device, current-frame data sent by the network device over the channel, or sending current-frame data to the network device over the channel.

7. The method according to claim 6, wherein before determining, by a terminal device, a backoff time for a current frame, the method further comprises:

receiving, by the terminal device, indication signaling sent by the network device, wherein the indication signaling indicates the backoff time.

8. The method according to claim 7 wherein the indication signaling comprises information indicating N backoff time and at least one of the following:
a length for each of the N backoff time; or
a length for a particular backoff time in the N backoff time and length information indicating how to obtain lengths for other backoff time in the N backoff time using the particular backoff time, wherein the length information includes an index relationship, a multiple relationship, or an arithmetic sequence relationship between the particular backoff time and the other backoff time in the N backoff time; and, wherein N is a positive integer.

9. The method according to claim 8, wherein the indication signaling further comprises:
duration $L_{cca}$ of a CCA corresponding to each backoff time in the N backoff time.

10. The method according to claim 8, wherein the indication signaling further comprises:
information indicating a maximum quantity $N_{max}$ of the N backoff time.

11. An apparatus for sending and receiving information, comprising:
a processor, configured to determine a backoff time for a current frame and to perform a clear channel assessment (CCA) on a channel at an end moment of the determined backoff time for the current frame, and obtain an assessment result of the CCA, wherein the backoff time is previously agreed upon by a network device and a terminal device in a communications protocol; and
a transceiver, configured to:
when the assessment result of the CCA obtained by the processor indicates the channel is in an idle state, send a pilot over the channel; and
after sending the pilot, send current-frame data to a terminal device over the channel, or receive, over the channel, current-frame data sent by a terminal device.

12. The apparatus according to claim 11, wherein the transceiver is further configured to:
send indication signaling to the terminal device, wherein the indication signaling indicates i indicate the backoff time for the current frame determined by the processor.

13. The apparatus according to claim 11, wherein the indication signaling sent by the transceiver comprisesinformation indicating N backoff time and at least one of the following:
a length for each of the N backoff time; or
a length for a particular backoff time in the N backoff time and length information indicating how to obtain lengths for other backoff time in the N backoff time using the particular backoff time, wherein the length information includes an index relationship, a multiple relationship, or an arithmetic sequence relationship between the particular backoff time and the other backoff time in the N backoff time; and, wherein N is a positive integer.

14. The apparatus according to claim 13, wherein the indication signaling sent by the transmitter further comprises:
duration $L_{cca}$ of a CCA corresponding to each backoff time in the N backoff time.

15. The apparatus according to claim 13, wherein the indication signaling sent by the transceiver further comprises:
information indicating a maximum quantity $N_{max}$ of the N backoff time.

16. An apparatus for sending and receiving information, comprising:
a processor, configured to determine a backoff time for a current frame, wherein the backoff time is a backoff time before a network device performs a clear channel assessment (CCA), and to listen on a channel based on the backoff time for the current frame, wherein the backoff time is previously agreed upon by the network device and a terminal device in a communications protocol; and
a transceiver, configured to: when the processor detects, over the channel, a pilot sent by the network device, receive current-frame data sent by the network device over the channel, or send current-frame data to the network device over the channel.

17. The apparatus according to claim 16, wherein the transceiver is further configured to:
receive indication signaling sent by the network device, wherein the indication signaling indicates the backoff time for the current frame determined by the processor.

18. The apparatus according to claim 16, wherein the indication signaling received by the transceiver comprises information indicating N backoff time and at least one of the following:
a length for each of the N backoff time; or
a length for a particular backoff time in the N backoff time and length information indicating how to obtain lengths for other backoff time in the N backoff time using the particular backoff time, wherein the length information includes an index relationship, a multiple relationship, or an arithmetic sequence relationship between the particular backoff time and the other backoff time in the N backoff time; and, wherein N is a positive integer.

19. The apparatus according to claim 18, wherein the indication signaling received by the transceiver further comprises:
duration $L_{cca}$ of a CCA corresponding to each backoff time in the N backoff time.

20. The apparatus according to claim 18, wherein the indication signaling received by the transceiver further comprises:
information indicating a maximum quantity $N_{max}$ of the N backoff time.

* * * * *